(12) United States Patent
Taylor et al.

(10) Patent No.: US 12,137,115 B2
(45) Date of Patent: Nov. 5, 2024

(54) SYSTEM AND METHODS FOR MITIGATING FRAUD IN REAL TIME USING FEEDBACK

(71) Applicant: TrafficGuard Pty Ltd, Bentley (AU)

(72) Inventors: Luke Anthony James Taylor, Cloverdale (AU); Raigon Jolly, Thornlie (AU); André Bonkowski, Lynwood (AU); Andrey Kostenko, East Perth (AU)

( * ) Notice: Subject to any disclaimer, the term of this patent is extended or adjusted under 35 U.S.C. 154(b) by 870 days.

(21) Appl. No.: 17/048,359

(22) PCT Filed: Apr. 17, 2019

(86) PCT No.: PCT/AU2019/050343
§ 371 (c)(1),
(2) Date: Oct. 16, 2020

(87) PCT Pub. No.: WO2019/200432
PCT Pub. Date: Oct. 24, 2019

(65) Prior Publication Data
US 2021/0067544 A1    Mar. 4, 2021

(30) Foreign Application Priority Data

Apr. 18, 2018   (AU) ................................ 2018901298

(51) Int. Cl.
*H04L 29/06*        (2006.01)
*G06F 11/30*        (2006.01)
(Continued)

(52) U.S. Cl.
CPC ...... *H04L 63/1441* (2013.01); *G06F 11/3065* (2013.01); *G06F 17/18* (2013.01); *G06N 20/00* (2019.01)

(58) Field of Classification Search
CPC .. H04L 63/1441; G06N 20/00; G06F 11/3065
See application file for complete search history.

(56) References Cited

U.S. PATENT DOCUMENTS 7,536,552 B2    5/2009   Touitou et al.
8,499,063 B1 *  7/2013   Satish ...................... G06F 8/62
                                                    709/224
(Continued)

FOREIGN PATENT DOCUMENTS

EP      2 432 188 A1      3/2012
JP      2009/230524 A     10/2009
(Continued)

OTHER PUBLICATIONS

Extended European Search Report in EP Application No. 19788318.4 dated Dec. 10, 2021, 9 pages.
(Continued)

*Primary Examiner* — Jason K Gee
(74) *Attorney, Agent, or Firm* — Edmond DeFrank

(57) ABSTRACT

An embodiment of a feedback-based system and methods are disclosed for real-time mitigation of fraud and otherwise invalid traffic in a mobile ad environment. The system of three complementary facets of one embodiment comprises four major sub-systems: prevention, detection, control and reporting, which work in cohesion with one another to achieve the common goal of the system. In the embodiment, deterministic and probabilistic methods are applied across all levels of user engagement (impressions, clicks, installs, post-install events, and conversions) to detect the likely sources of invalid traffic and block them in real time. A distinctive and unifying feature of the embodiment of the system is the feedback loop that connects advanced analytics and machine learning techniques that the detection subsystem employs at all levels of user engagement to the real-time blocking mechanism of the prevention subsystem that operates at the initial levels of user engagements, such as clicks and impressions. Embodiments of the invention can help ad networks and advertisers improve their competitive posi- (Continued)

tions in their respective fields by significantly reducing the negative impact of mobile ad fraud.

20 Claims, 14 Drawing Sheets

(51) Int. Cl.
  *G06F 17/18* (2006.01)
  *G06N 20/00* (2019.01)
  *H04L 9/40* (2022.01)

(56) References Cited

U.S. PATENT DOCUMENTS

| | | | |
|---|---|---|---|
| 8,799,069 B2 | 8/2014 | Gupta et al. | |
| 9,027,140 B1* | 5/2015 | Watkins | G06Q 30/0277 |
| | | | 709/227 |
| 10,929,879 B2* | 2/2021 | Cheng | G06Q 30/0248 |
| 2005/0166049 A1 | 7/2005 | Touitou et al. | |
| 2007/0255821 A1 | 11/2007 | Ge et al. | |
| 2013/0014253 A1* | 1/2013 | Neou | H04L 63/1441 |
| | | | 726/22 |
| 2013/0226692 A1 | 8/2013 | Kouladjie et al. | |
| 2019/0158520 A1* | 5/2019 | DiValentin | H04L 63/145 |

FOREIGN PATENT DOCUMENTS

| | | |
|---|---|---|
| WO | WO-2013/066755 A1 | 5/2013 |
| WO | WO-2017/202336 A1 | 11/2017 |

OTHER PUBLICATIONS

Communication Pursuant to Article 94(3) EPC in European Patent Application No. 19788318.4 dated Jan. 16, 2023, 7 pages.
Office Action in Israeli Patent Application No. 278104 dated Mar. 20, 2023, 3 pages.
Office Action in JP Application No. 2021-506015 dated May 30, 2023, 16 pages.
Invalid Traffic Detection and Filtration Guidelines Addendum, Oct. 15, 2015, Final (Version 1.0), Media Rating Council (MRC), 32 pages.
Search Report and Written Opinion in International Application No. PCT/AU2019/050343 dated Jul. 25, 2019, 9 pages.
International Preliminary Report on Patentability in International Application No. PCT/AU2019/050343 dated Aug. 11, 2020, 123 pages.
DeviceAtlas; https://deviceatlas.com/bot-detection, dated Nov. 12, 2016 and retrieved from the internet on Oct. 16, 2020, 6 pages.

* cited by examiner

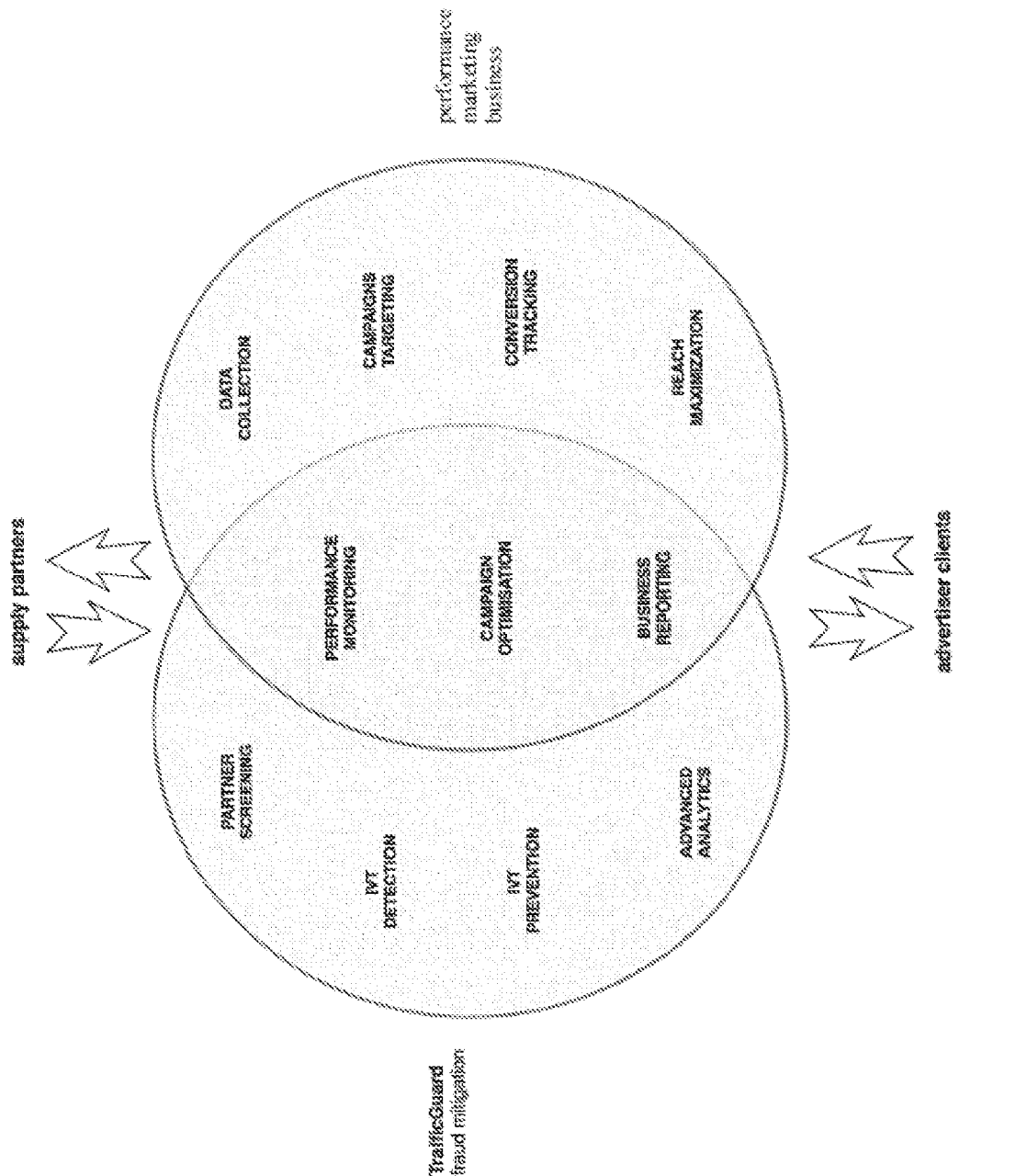
FIGURE 3 Functional overlap between TrafficGuard™ and performance marketing business technology platform

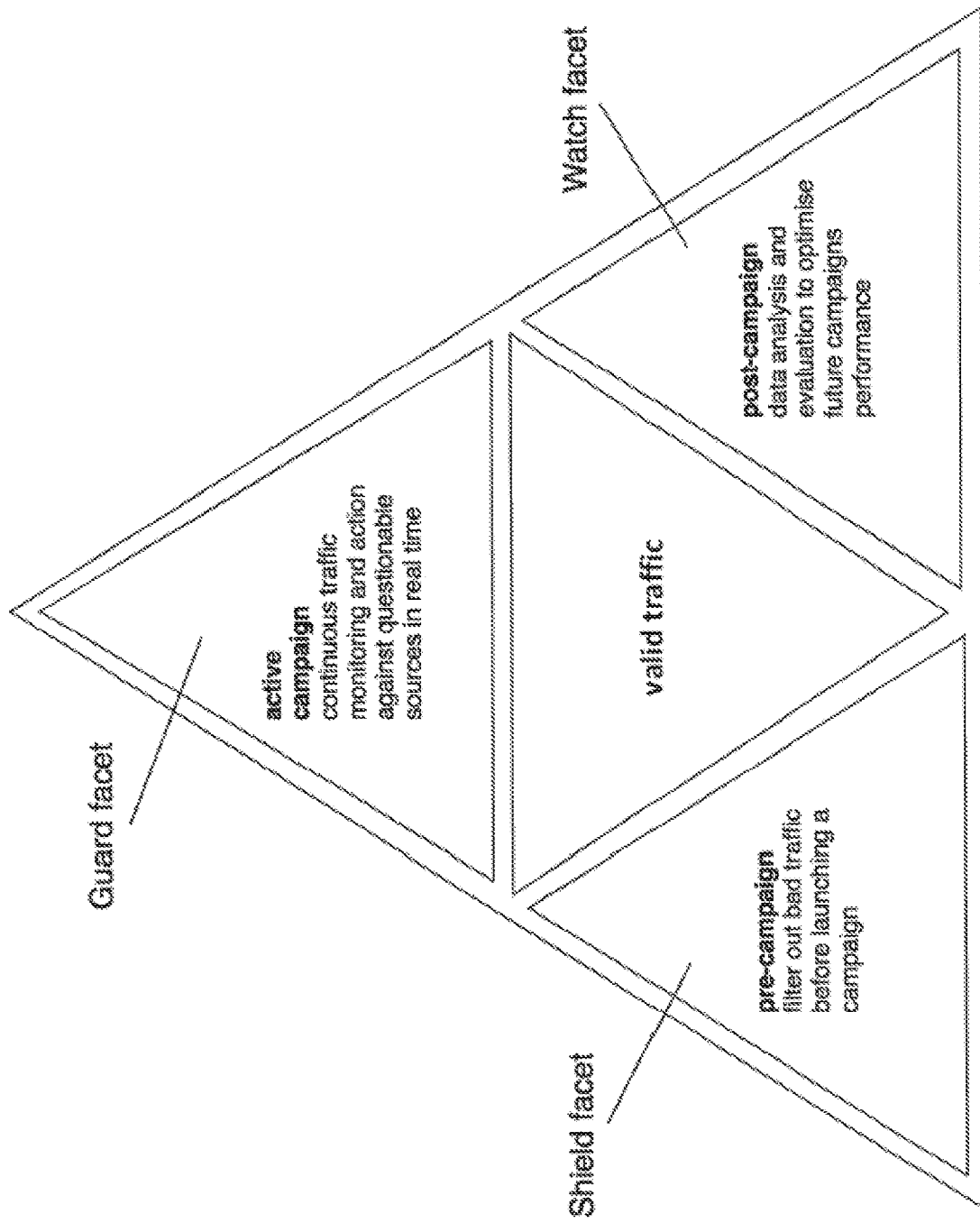
FIGURE 4 Three major facets of TrafficGuard™ system.

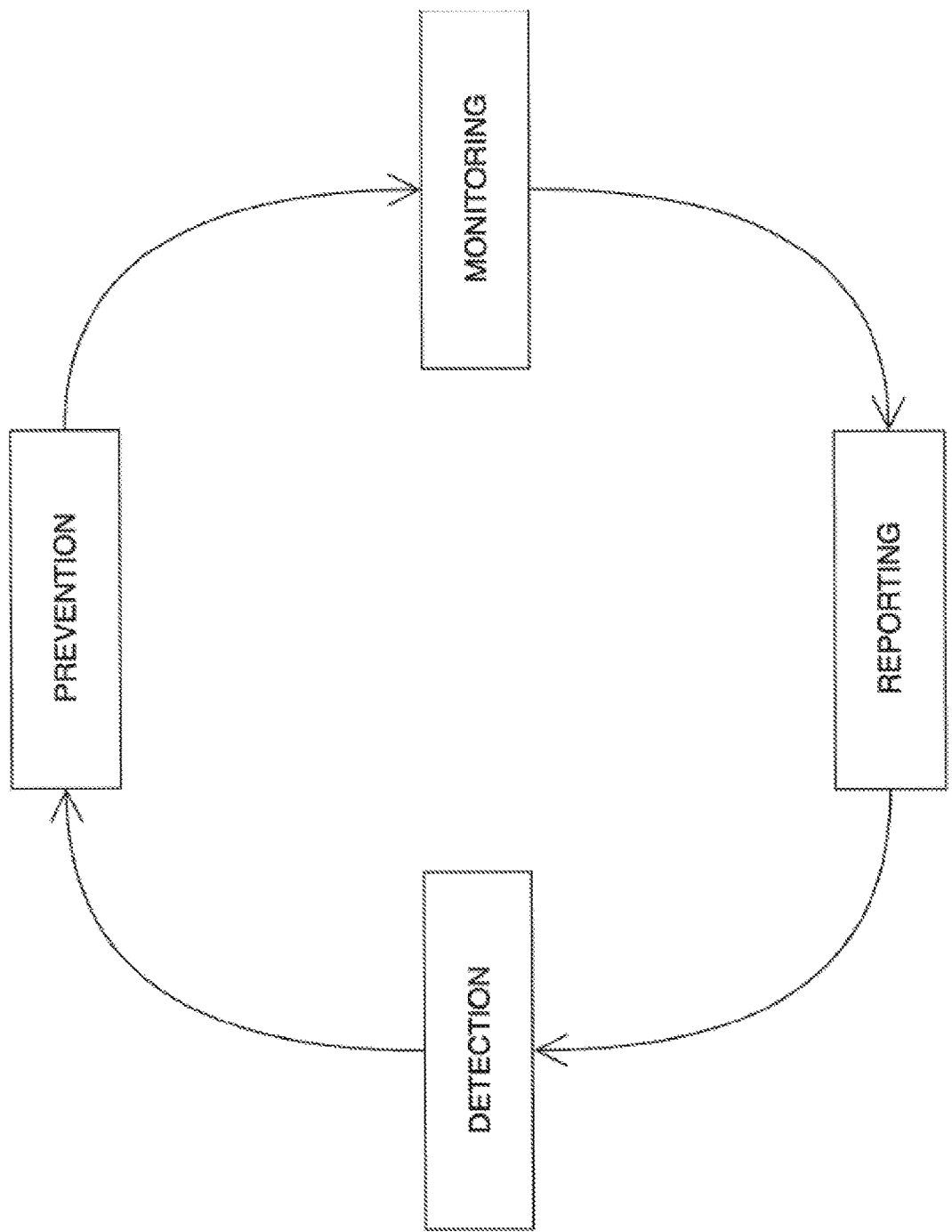
FIGURE 5 Four major subsystems of Traffic-Guard™ system.

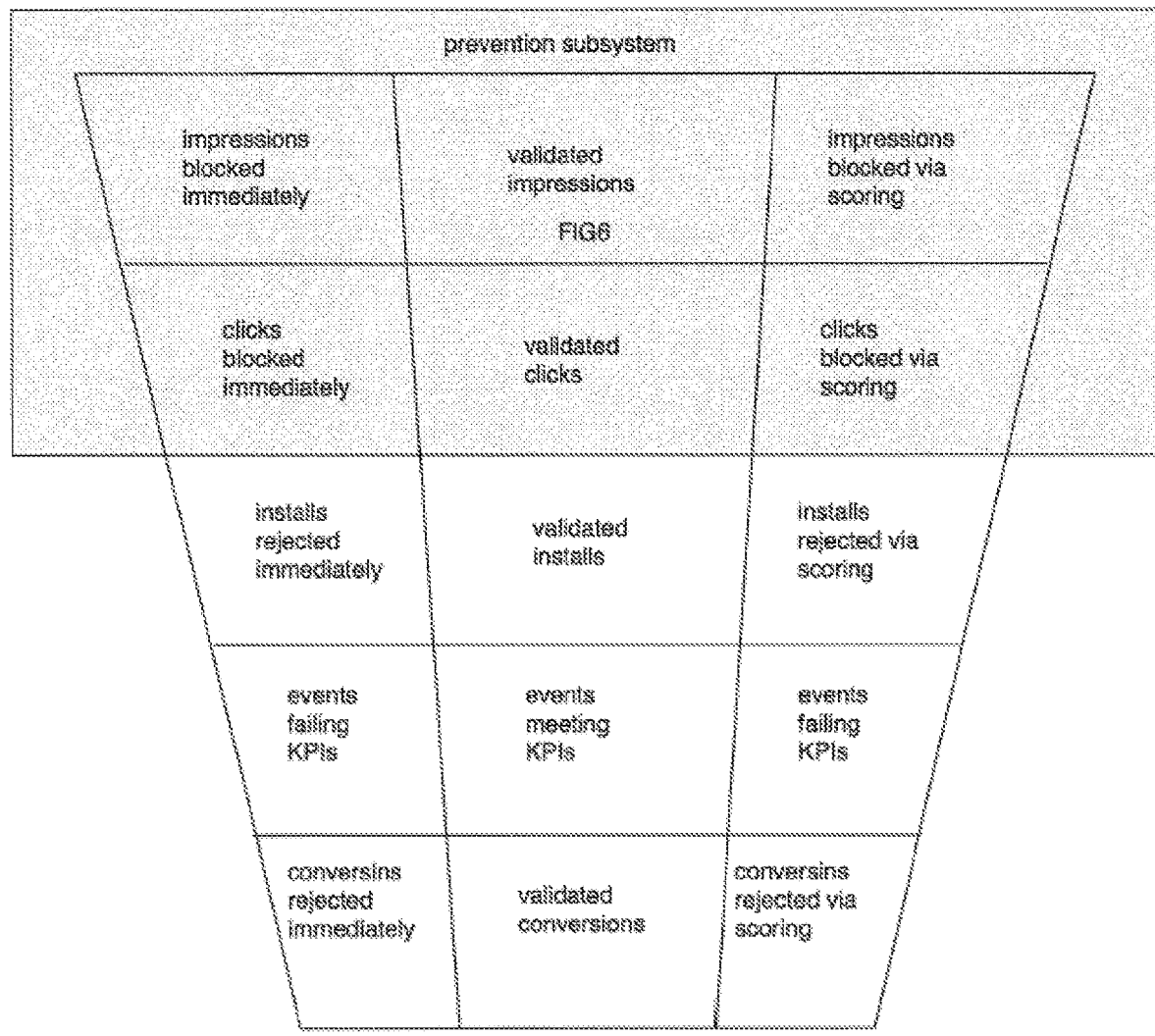
FIGURE 6 Five levels of user engagement the detection subsystem of TrafficGuard™ system operates at.

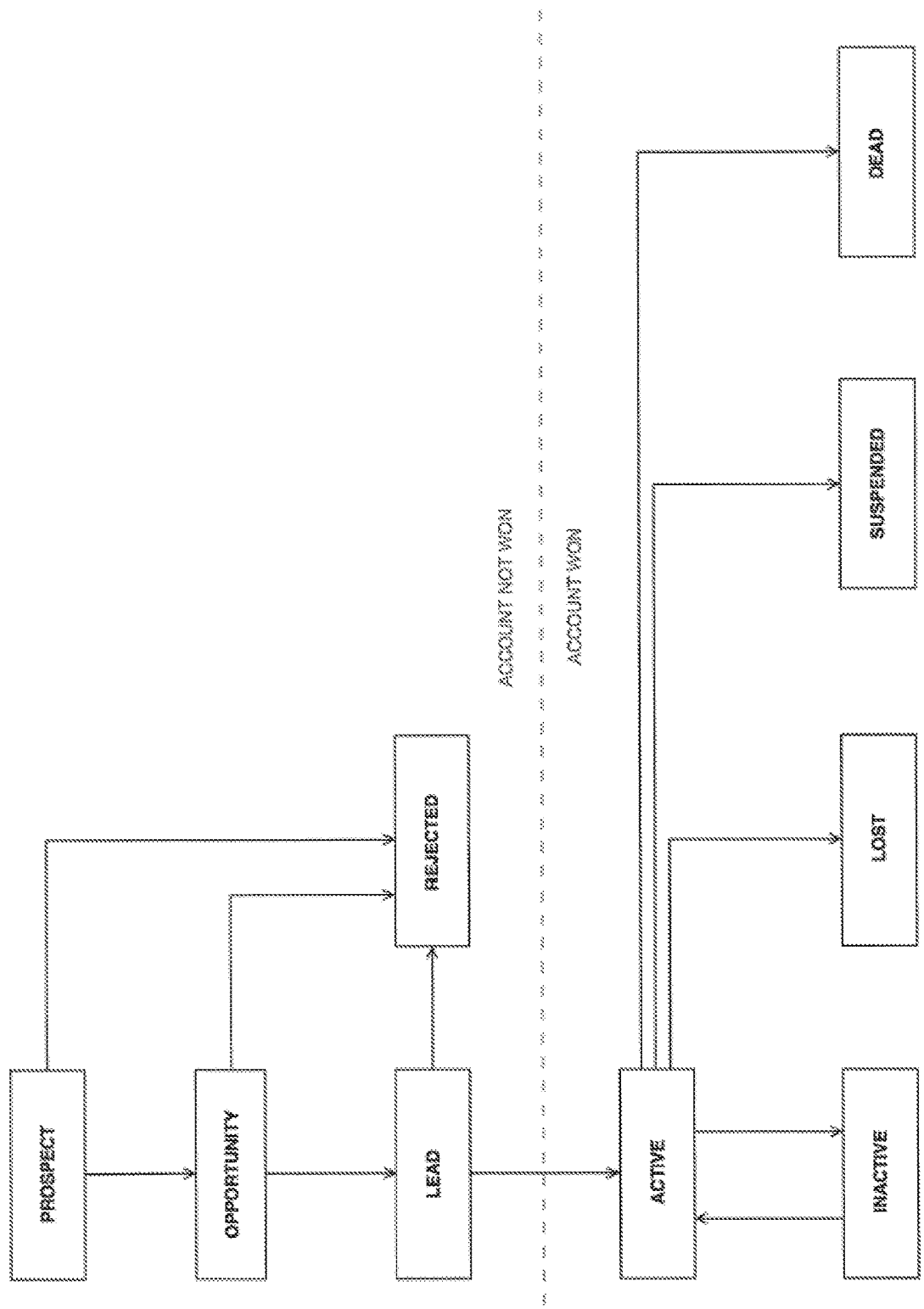
FIGURE 7 Partner status workflow

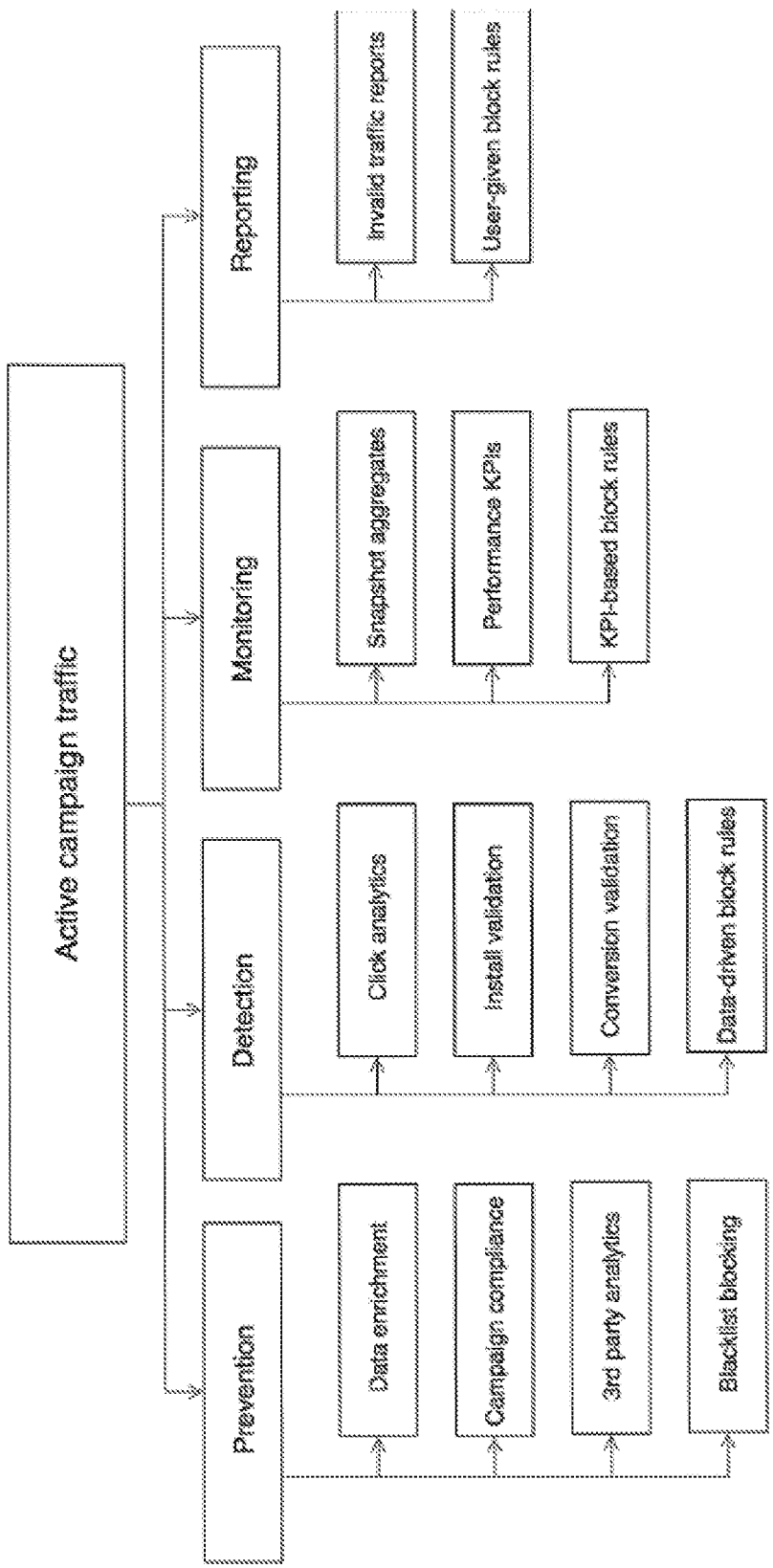
FIGURE 8 Key processes of TrafficGuard™ subsystems.

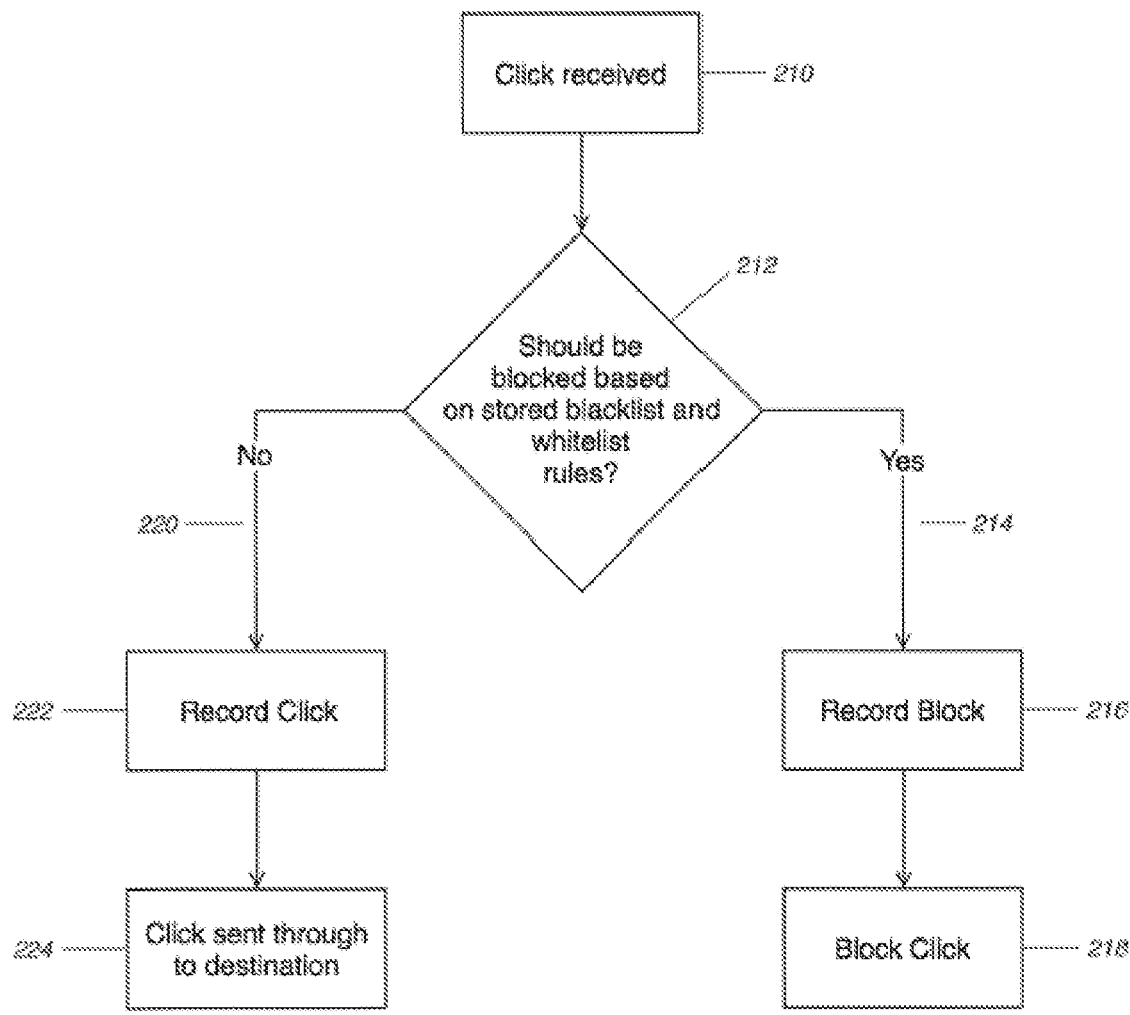
FIGURE 9 TrafficGuard™ system traffic blocking diagram.

```
block
├── global user id
│   ├── for 6h if its click count exceeds 3/sec or 5/min or 15/interval
│   │   01 gluser click limit
│   ├── for 6h if multiple initial tracking ids per gluser-campaign-partner
│   │   combination
│   │   03 cookie tamper tracking
│   ├── for 6h if max ip address distance exceeds 100 km
│   │   09 gluser distance
│   └── for 6h if device hops...are present
│       11 gluser device hops
├── ip address
│   ├── for 3h if frequent clicker ip
│   │   06 frequent clicker ip
│   ├── for 6h if gluser distance ip
│   │   10 gluser distance ip
│   └── for 6h if device hops...are present
│       12 gluser device hops ip
├── fingerprint
│   ├── for 6h if multiple global user ids per session
│   │   02 cookie tamper gluser
│   ├── for 6h if multiple global user ids per initial tracking id
│   │   04 cookie tamper initial tracking
│   ├── for 3h if click count exceeds 10 per 15 min and ......
│   │   05 suspicious ip limit
│   └── for 3h if coefficient of variation < 4 & mean click of 50 per min & at
│       least 5 distinct minutes ...
│       07 frequent clicker fingerprint
├── partner + source + referrer domain
│   └── for 3h if coefficient of variation < 4 & average click count exceeds
│       50/min & have at least 5 distinct minutes
│       08 frequent clicker overall a s r
└── some other level to block at...
    └── some other rule to identify offending cases...
```

FIG. 10 Some of the rules for blocking clicks at the WAF level

FIG. 11 Exemplifying the content of the blacklist table by reason id

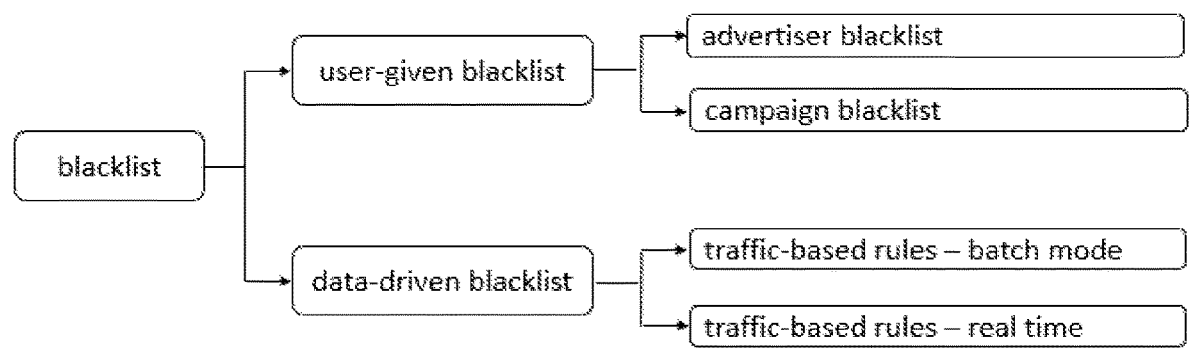
FIG. 12 Blacklist rules classification

SYSTEM AND METHODS FOR MITIGATING FRAUD IN REAL TIME USING FEEDBACK

FIELD OF THE INVENTION

The present invention relates generally to the field of fraud protection and prevention.

Although the present invention will be described with particular reference to mitigating, and more specifically, to detecting and preventing fraud comprising invalid traffic on ads in a mobile environment, it will be appreciated that implementations of the invention may be used to provide protection in respect of other types of fraud or deception.

BACKGROUND ART

Any discussion of the background art throughout the specification should in no way be considered as an admission that such background art is prior art, nor that such background art is widely known or forms part of the common general knowledge in the field in Australia or worldwide.

In order to understand the background to the invention being claimed, the following description is provided of the Applicant's advertising network (ad network), in which an embodiment of the invention is to be operated and the major problems it is designed to seek to solve.

The Applicant is a global mobile advertising technology company, operating an ad network. It helps the world's biggest brands acquire users for their mobile software applications (apps), wherever they are in the digital world. It does this on a cost-per-install basis, where on the demand-side of the ad network, an advertiser client only pays if an install of their app occurs on a device of a user. On the supply-side of the ad network, the business aggregates traffic supply from multiple sources which one can use to display advertising across the internet. This constantly growing network, often referred to as the ad network's supply partners, is the source of all traffic that the ad network tracks electronically.

In essence the ad network sits between the advertiser client and the supply partner. On the one hand, it gives advertisers access to their large, global network of quality partners, and on the other hand, it gives partners access to ads, helping them to monetise their sites. The inventor's proprietary ad network platform, provided under the trade mark NXUS™, is operable to process large amounts of data from different points in the consumer journey via the ad network to optimise ad delivery and provide valuable insights into campaign performance.

The NXUS™ system is the ad network platform for advertiser clients and supply partners intersecting at the campaign level. The platform is directed to, and is operable for, matching the needs of advertisers (demand) with the right sources of traffic (supply) to ensure campaign efficiency by tracking performance results in real time and continuously optimising traffic. The NXUS™ system operates at scale, processing in excess of six billion data points each day across thousands of active campaigns. Amongst other functions, it is operable to provide monitoring, reporting and a number of algorithmic optimisation solutions to maximise campaign performance.

Following some initial success, a problem, however, was identified by the ad network in that fraud, and other types of invalid traffic (IVT), had started to dominate the traffic and was skewing the performance metrics and decisions based on them. Fraudulent installs and conversions were difficult to detect and their impact was often compounded when their presence skewed performance data used by the NXUS™ system or advertiser clients themselves for campaign optimisation and decision making. With fraud on the rise, precious ad dollars were wasted on sources useless for engagement while distorting performance and measurement accuracy.

The problem of fraud in mobile advertising is global. An estimated $7.4 billion was wasted on display ads alone in 2016, a figure that will rise to $10.9 billion by 2021, according to Forrester (www.forrester.com/PoorQuality+Ads+Cost+Marketers+74+Billion+Last+Year/-/E-PRE9724). As the dominance of mobile traffic over desktop in 2018 and future years is no longer doubted, these estimates essentially quantify the scale of the problem in mobile advertising. With the advertisers becoming more aware of the problem, it has become natural for every major player in the area to either seek to develop their own anti-fraud solution or use someone else's fraud preventing services to support their business.

A thorough analysis by the inventors of the existing proposals in the area of mobile ad fraud protection showed that most solutions focus on scoring or flagging clicks and/or conversions, which is clearly different from blocking invalid traffic in real time. Simply reporting the flagged clicks or conversions instead of immediately blocking them represents a post-factum paradigm in fraud prevention, where the preventive measures will be applied after the damage had been done, often long after the fraud has been detected. This will likely result in charge backs, adjustments and eventually reputation loss.

What is required is a system that will mitigate fraud and otherwise invalid traffic in real time, immediately after the impression was served or click was registered. The system should ideally be capable of detecting invalid traffic using data available at all levels of user engagements (including impressions, clicks, installs, post-install events, and conversions) and then translating the obtained insights into rules and actions that could be used to block traffic at the earliest levels of the conversion funnel, such as impressions or clicks.

To develop a system that would efficiently mitigate invalid traffic in real time, at the early levels of user engagement (i.e. of the conversion funnel), and at the scale that the NXUS™ system operates at, had become a major problem to solve for the inventors. It was required to design a system that would continuously impede invalid traffic by processing data at all layers of monitoring (display, click, install, post-install events and conversions) to improve the accuracy of performance reporting at each of these layers, which in turn would drive performance optimisation through more informed decisions.

The following desirable initial system requirements, sought to be provided by embodiments of the invention, were identified by the inventors in this regard:
1. Effective screening of all new supply partners. It is always better to stop something bad from happening than it is to deal with it after it has happened. In other words prevention is better than cure.
2. Consistency with Media Rating Council's (MRC's) guidance for IVT detection and filtration described in MRC's *Invalid Detection and Filtration Addendum* document.
3. Efficient integration with existing anti-fraud solutions that proved to be efficient in addressing particular aspects of mobile ad fraud, for any good system is always more than the sum of its parts.
4. Blocking invalid traffic in real time and at the early levels of the conversion funnel, such as impressions and clicks, thereby preventing installs and conversions from getting attributed to fraud by simply not passing fraudulent clicks to advertiser.

5. Processing data at all layers of monitoring (including impressions, clicks, installs, post-install events and conversions) as part of an automatic real-time traffic validation solution to mitigate the impact of fraud and optimise performance by enabling efficient scoring mechanisms, driven either by simple deterministic rules or sophisticated machine learning algorithms, continuously feeding the blocking subsystem.
6. Augmenting complex data-driven logic to block invalid traffic with simple human-supplied rules based on considerations not limited to those obtained automatically from data.
7. Using advanced analytics and machine learning to continuously detect new types of fraud and otherwise suspicious patterns in the big data growing with each completed campaign.

In addition, it is desirable that the entire solution should be capable of and operable to cope and perform under an increased or expanding workload, it should be scalable to larger amounts of data that the NXUS™ system can collect and process on a daily basis. Embodiments of a system seeking to address all of the above requirements is disclosed herein as the solution that the inventors invented to effectively mitigate the problem of fraud in mobile advertising. While blocking clicks in real-time have been proposed for web traffic, for example, in US 20070255821 A1, the inventors are not aware of related proposals for real-time blocking of mobile ad traffic by using data available at all levels of user engagement.

It is against this background that the present invention has been developed.

SUMMARY OF THE INVENTION

It is an object of embodiment of the present invention to seek to overcome or ameliorate at least one or more of the disadvantages of the prior art, or to provide a useful alternative.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

The term "real-time", for example, "displaying real-time data," refers to the display of the data without intentional delay, given the processing limitations of the system and the time required to accurately measure the data.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures and data-bases may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one", in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

Embodiments of the present invention seek to overcome, or at least ameliorate, one or more of the deficiencies of the prior art mentioned above, or to provide the consumer with a useful or commercial choice.

Other advantages of embodiments of the present invention will become apparent from the following description, taken in connection with the accompanying drawings, wherein, by way of illustration and example, preferred embodiments of the present invention are disclosed.

According to a first principal aspect of the present invention, there is provided a method for mitigating fraud, the method comprising: storing, in storage, electronic program instructions for controlling processing means and controlling the processing means via the electronic program instructions to:

receive input, the input comprising a data communication intended for a recipient;

perform a prevention process, the prevention process comprising analysing input received to determine whether a source of the data communication is a legitimate source or a malicious source, and preventing the data communication from being communicated to the intended recipient when it is determined that the source of the data communication is a malicious source, to generate a fraud mitigated output comprising the data communication being communicated to the intended recipient when it is determined that the source of the data communication is a legitimate source, and perform a detection process using input received to generate a detection process output comprising an indication of an at least potentially malicious source of data communication, and to provide the detection process output as input to the prevention process for use in the prevention process analysis.

Embodiments and implementations of the above described aspects, and those aspects described below, may incorporate one or more of the following optional features.

In one embodiment, the method further comprises controlling the processing means via the electronic program instructions to perform a monitoring process using the fraud mitigated output to generate a monitoring process output comprising a further indication of an at least potentially malicious source of data communication, and to provide the monitoring process output as input to the prevention process for use in the prevention process analysis, and to the detection process as input for use in generating the detection process output.

In another embodiment, the detection process output and/or the monitoring process output is provided as input to the prevention process for use in the prevention process analysis via a respective feedback loop.

In a further embodiment, at least one of the prevention process, the detection process, and the monitoring process are performed in real time.

In one embodiment, the method further comprises controlling the processing means via the electronic program instructions to perform a reporting process in respect of at least one of the fraud mitigated output, the detection process output, and the monitoring process output to generate a report.

In such an embodiment, the method may further comprise controlling the processing means via the electronic program instructions to display the report as output via output means comprising a display.

In an embodiment, the method is for mitigating fraud in an advertising campaign undertaken in a mobile environment, in which case the fraud may comprise invalid traffic on ads in the mobile environment, and the fraud mitigated output may comprise quality traffic.

In one embodiment, the detection process comprises continuously analysing mobile ad traffic at all levels of user engagement to, preferably routinely, provide detection process output comprising data driven rules for blocking fraud and otherwise invalid traffic.

In another embodiment, the prevention process comprises blocking fraud and otherwise invalid traffic at initial levels of user engagement, such as clicks, by utilising a feedback loop connecting detection process output comprising advanced analytics and machine learning at multiple levels from the detection process with a real time blocking means or mechanism.

In a further embodiment, the monitoring process comprises fast data aggregation to generate monitoring process output comprising multiple snapshot tables (and data stores) to support the advanced analytics and machine learning of the detection process, automatic monitoring of set expected performance indicators, and a feedback loop connecting analytics of the monitoring system with the real time blocking means or mechanism.

In one embodiment, the reporting process comprises effectively combining information regarding actions taken (such as tables, charts and dashboards on blocked clicks, rejected installs, for example) with an interface process for receiving input providing capability for a user to, in addition to data-driven rules and heuristics supplied by the detection process as detection process output, to communicate or pass an, preferably immediate preventative, action via a feedback loop connecting the reporting process with the real-time blocking means or mechanism.

In another embodiment, the prevention process comprises a dual channel of blocking clicks either immediately by one or more deterministic rules or via click scoring, as based on probabilistic heuristics and machine learning algorithms associated with multiple penalties and rewards to reflect on the degree of confidence and risk when blocking each incoming click.

In a further embodiment, the prevention process comprises a dual channel of rejecting installs (conversions) either immediately by one or more deterministic rules or via install (conversion) scoring, as based on probabilistic heuristics and machine learning algorithms associated with certain penalties and rewards to reflect on the degree of confidence and risk when invalidating each install (conversion).

In one embodiment, the prevention process comprises an aggregation logic, preferably via simple conditional counting or complex clustering algorithms, to translate attributes of all rejected installs and conversions into attributes of clicks and/or impressions so that blocking of fraud and otherwise invalid traffic can be performed at the earliest levels of user engagement, before it can reach an advertiser's attribution platform.

In one embodiment, the shielding process, guarding process, and monitoring process are complementary and operable to continuously detect and/or block fraud and otherwise invalid traffic before, during, and after an advertising campaign.

In another embodiment, the prevention, detection, monitoring, and reporting systems operate in cohesion with one another to provide efficient invalid traffic mitigation for all active campaigns in real time.

According to a second principal aspect of the present invention, there is provided a system for mitigating fraud, the system comprising:
  processing means;
  storage storing electronic program instructions for controlling the processing means; and
  an input means;
  wherein the processing means is operable, under control of the electronic program instructions, to perform any embodiment of the method arranged in accordance with the method of the first principal aspect or the method of the sixth principal aspect, or as described herein.

In one embodiment, the system comprises: a prevention subsystem operable to perform the prevention process; a detection subsystem operable to perform the detection process; a monitoring subsystem operable to perform the monitoring process; and a reporting subsystem operable to perform the reporting process.

According to a third principal aspect, there is provided a computer-readable storage medium on which is stored instructions that, when executed by a computing means, causes the computing means to perform any embodiment of the method arranged in accordance with the method of the first principal aspect or the method of the sixth principal aspect, or as described herein.

According to a fourth principal aspect of the present invention, there is provided a computing means programmed to carry out any embodiment of the method arranged in accordance with the method of the first principal aspect or the method of the sixth principal aspect, or as described herein.

According to a fifth principal aspect of the present invention, there is provided a data signal including at least one instruction being capable of being received and interpreted by a computing system, wherein the instruction implements any embodiment of the method arranged in accordance with the method of the first principal aspect or the method of the sixth principal aspect, or as described herein.

According to a sixth principal aspect of the present invention, there is provided a method for mitigating fraud, the method comprising:
  storing, in a storage, electronic program instructions for controlling processing means, and
  controlling the processing means via the electronic program instructions to:
  receive input via an input means; and
  process the input to generate a fraud mitigated output.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which:

FIG. 3 depicts functional overlap between the system of FIG. 1A and other business system technology platforms;

FIG. 4 depicts three major facets of the system of FIG. 1A: shield, guard, and watch;

FIG. 5 depicts four major subsystems of the system of FIG. 1A: detection, prevention, monitoring, and reporting;

FIG. 6 depicts five levels of user engagement that a detection subsystem of the system of FIG. 1A operates at: impressions, clicks, installs, post-install events and conversions;

FIG. 7 depicts partner status workflow;

FIG. 8 depicts key processes of subsystems of the system of FIG. 1A

FIG. 9 depicts a traffic blocking diagram of the system of FIG. 1A;

FIG. 10 depicts some of the rules for blocking clicks at the WAF level;

Figure 11:
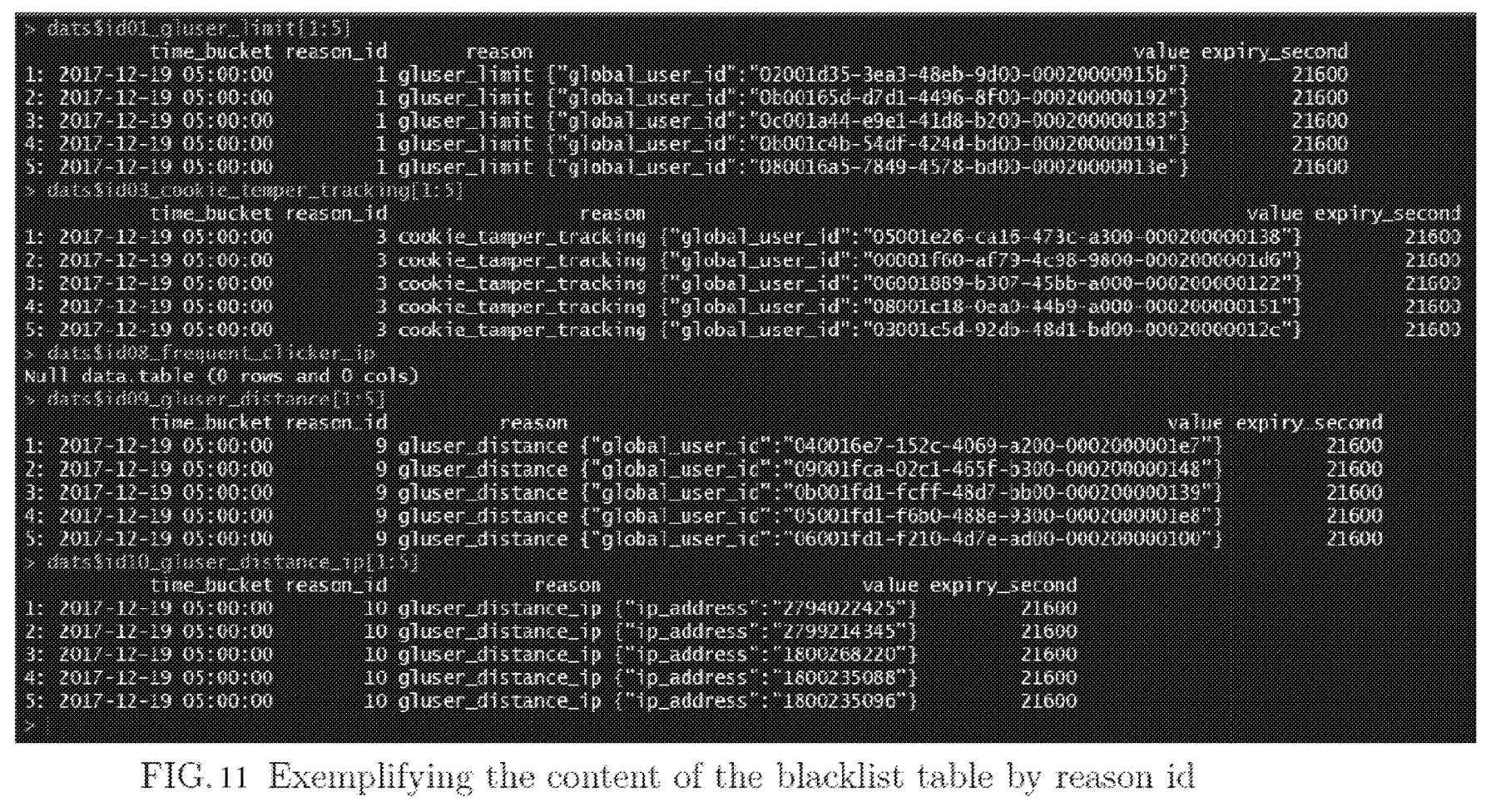

FIG. 11 depicts typical content of the blacklist table by reason id; and

FIG. 12 depicts blacklist rules classification.

DETAILED DESCRIPTION

Figure 1A:
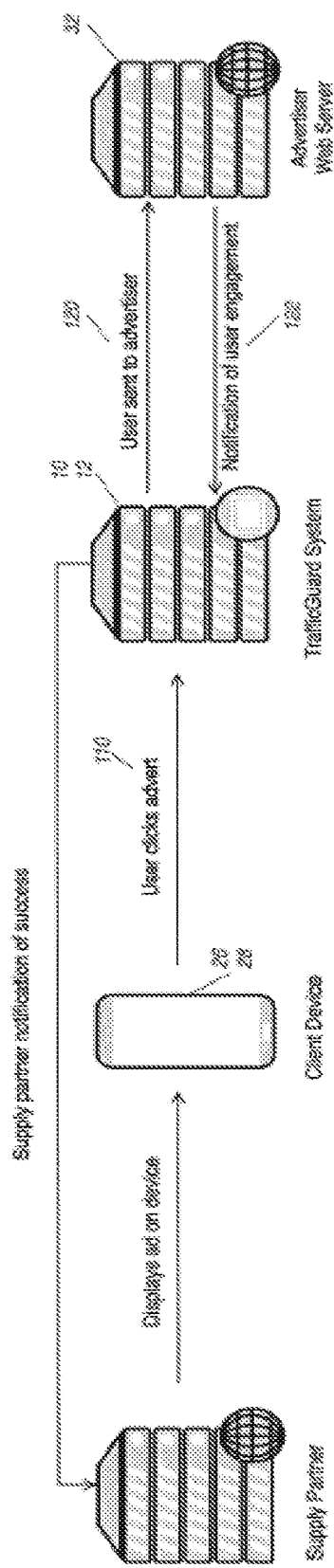
FIG. 1A depicts a simplified high level diagram of an embodiment of a system in accordance with an aspect of the invention, showing communication flow of a valid non-fraudulent user.

The present invention is not to be limited in scope by the following specific embodiments. This detailed description is intended for the purpose of exemplification only. Functionally equivalent products, compositions and methods are within the scope of the invention as described herein. Consistent with this position, those skilled in the art will appreciate that the invention described herein is susceptible to variations and modifications other than those specifically described. It is to be understood that the invention includes all such variations and modifications. The invention also includes all of the steps, features, compositions and compounds referred to or indicated in the specification, individually or collectively and any and all combinations or any two or more of the steps or features.

Further features of the present invention are more fully described in the examples herein. It is to be understood, however, that this detailed description is included solely for the purposes of exemplifying the present invention, and should not be understood in any way as a restriction on the broad description of the invention as set out hereinbefore.

The entire disclosures of all publications (including patents, patent applications, journal articles, laboratory manuals, books, or other documents) cited herein are hereby incorporated by reference. No admission is made that any of the references constitute prior art or are part of the common general knowledge of those working in the field to which this invention relates.

Throughout this specification, unless the context requires otherwise, the word "comprise", or variations such as "comprises" or "comprising", will be understood to imply the inclusion of a stated integer or group of integers but not the exclusion of any other integer or group of integers.

Furthermore, throughout this specification, unless the context requires otherwise, the word "include", or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

The invention described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the invention. More particularly, the variation in upper or lower limits of a range will be 5% or as is commonly recognised in the art, whichever is greater.

Throughout this specification relative language such as the words 'about' and 'approximately' are used. This language seeks to incorporate at least 10% variability to the specified number or range. That variability may be plus 10% or negative 10% of the particular number specified.

In the drawings, like features have been referenced with like reference numbers.

From the discussion of the background art herein, it is evident that there are shortcomings in the existing technology. The embodiment of the invention seeks to improve this situation.

TrafficGuard™ System 10 Overview

In FIG. 1A, there is depicted a first embodiment of a system 10, implemented as part of a communication network, for mitigating fraud in accordance with aspects of the present invention, showing communication flow in the communication network during a first event. As will be described, the system 10 is an implementation of a feedback-based, real-time, mobile fraud mitigation system.

Figure 1B:
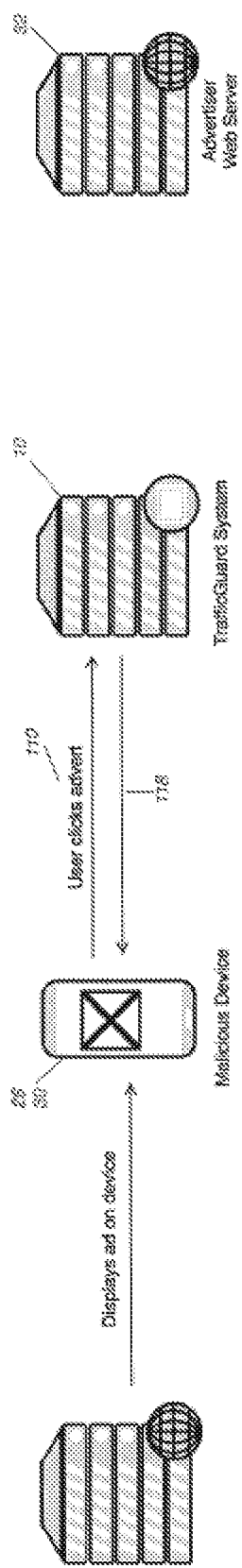
FIG. 1B depicts a simplified high level diagram of the system of FIG. 1A, showing communication flow of an invalid fraudulent user.

FIG. 1B shows communication flow in the communication network with the system 10 during a second event.

In the embodiment, the system 10 is for mitigating fraud in a campaign comprising an advertising campaign undertaken in a mobile environment, and the fraud comprises invalid traffic on ads in the mobile environment.

To this end, the implementation of the invention is provided in the form of a fraud mitigating platform comprising the system 10 and associated method, provided under the trade mark TrafficGuard™, in the embodiment, developed to seek to resolve the problem of complementing the system of the hereinbefore described business (i.e. the NXUS™ system) with an effective and efficient solution that is operable to, amongst other things, detect and prevent invalid traffic at scale, in real time and at the early levels of the conversion funnel. As will be described in further detail, in the embodiment, the system 10 comprises a data-driven enterprise grade fraud prevention and detection solution with a number of advantages. It is operable to facilitate compliance among the supply partners, giving them visibility into the quality of their sources and helping them to safeguard their reputation. For advertiser clients, it is operable to deliver quality traffic and conversions from their target audiences.

Mitigating mobile ad fraud and otherwise invalid traffic is clearly an important part of the more general campaign optimisation problem. In FIG. 3 there is a depiction of synergy of the business and TrafficGuard™ platforms. With the embodiment of the invention, the task of increasing revenue by simply finding more installs for a campaign becomes that of increasing revenue while minimising risks due to IVT. In the new scheme of things, the business system is operable to find mobile app installs (users) and employs the system 10 to make sure they are of high quality (that is to say, for example, from real users, potentially revenue generating users, genuinely interested in advertised products).

It will be appreciated that the invention is not limited in this regard, and implementations of the invention may be used to provide protection in respect of other types of fraud or deception.

The system 10 comprises a plurality of components, subsystems and/or modules operably coupled via appropriate circuitry and connections to enable the system 10 to perform the functions and operations herein described. The system 10 comprises suitable components necessary to receive, store and execute appropriate computer instructions such as a method for mitigating fraud in accordance with embodiments of the present invention.

Figure 1C:
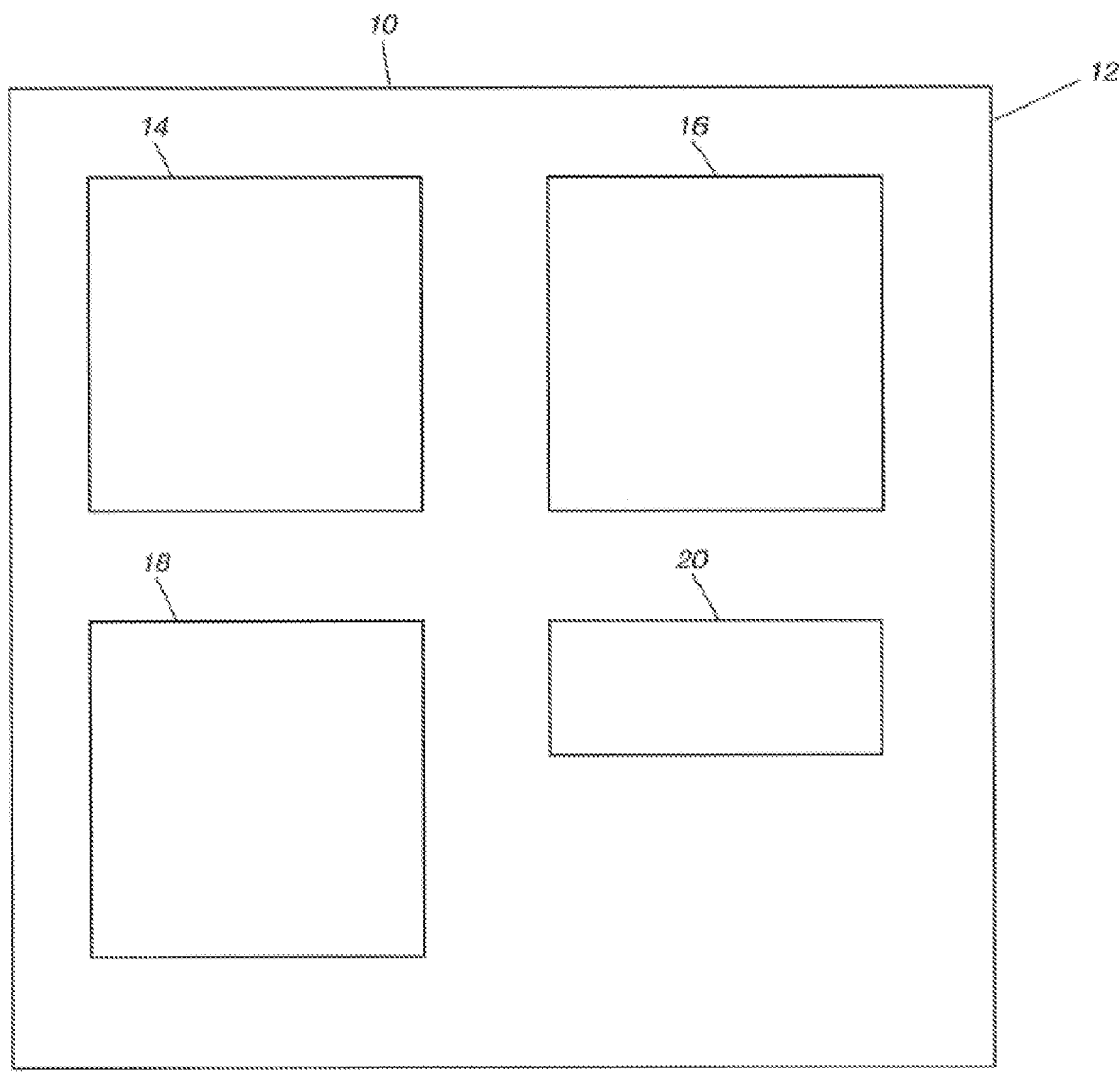
FIG. 1C depicts a schematic diagram of the system of FIG. 1A.

Particularly, as depicted in FIG. 1C, the system 10 comprises a computer system in the form of a server 12, in the embodiment. The server 12 comprises: computing means which in this embodiment comprises a controller 14 and storage 16 for storing electronic program instructions for controlling the controller 14, and information and/or data; a display 18 for displaying a user interface; and input means 20; all housed within a container or housing 22.

As will be described in further detail, the controller 14 is operable, under control of the electronic program instructions to receive input via an input means and to process the input to generate a fraud mitigated output.

Particularly, the controller 14 is operable, under control of the electronic program instructions, to:
receive input, the input comprising a data communication intended for a recipient;
perform a prevention process, the prevention process comprising analysing input received to determine whether a source of the data communication is a legitimate source or a malicious source, and preventing the data communication from being communicated to the intended recipient when it is determined that the source of the data communication is a malicious source, to generate a fraud mitigated output comprising the data communication being communicated to the intended recipient when it is determined that the source of the data communication is a legitimate source, and
perform a detection process using input received to generate a detection process output comprising an indication of an at least potentially malicious source of data communication, and to provide the detection process output as input to the prevention process for use in the prevention process analysis.

In the embodiment, the controller 14 is further operable, under control of the electronic program instructions to perform a monitoring process using the fraud mitigated output to generate a monitoring process output comprising a further indication of an at least potentially malicious source of data communication, and to provide the monitoring process output as input to the prevention process for use in the prevention process analysis, and to the detection process as input for use in generating the detection process output.

In the embodiment of the invention, the detection process output and the monitoring process output are provided as input to the prevention process for use in the prevention process analysis via respective feedback loops.

Furthermore, in the embodiment, the system 10 is operable to perform the prevention process, the detection process, and the monitoring process in real time.

In the embodiment, the controller 14 is further operable, under control of the electronic program instructions to perform a reporting process in respect of at least one of the fraud mitigated output, the detection process output, and the monitoring process output to generate a report.

In the embodiment, the input comprises data and/or information relating to the campaign.

In the embodiment described, the fraud mitigation output comprises quality traffic.

In embodiments of the invention, the input may be obtained by one or more of retrieving, receiving, extracting, and identifying it, from one or more sources. The one or more sources of input may reside on the storage 16, and/or elsewhere, remote from the server 12.

As depicted in FIGS. 1A and 1B, the system 10 is operable to communicate as part of the communication network via one or more communications link(s) 24, which may variously connect to one or more remote data communication sources or devices 26 such as servers, personal computers, terminals, wireless or handheld computing devices, landline communication devices, or mobile communication devices such as a mobile (cell) telephone or smartphone. At least one of a plurality of communications link(s) 24 may be connected to an external computing network through a telecommunications network.

In the embodiment described, the remote devices 26 include one or more legitimate client devices 28 (i.e. legitimate sources), owned and/or operated by a legitimate entity, one or more malicious devices 30 (i.e. illegitimate or malicious sources), owned and/or operated by a malicious entity, as well as a computing system in the form of an advertiser web server 32 owned and operated by advertiser or advertiser's designated party.

In the embodiment, the server 12 is physically located at a centrally managed administration centre. In alternative embodiments, it may be held on a cloud based platform.

The controller 14 comprises processing means in the form of a processor.

The storage comprises read only memory (ROM) and random access memory (RAM).

The server 12 is capable of receiving instructions that may be held in ROM, RAM or disc drives and may be executed by the server processor. The server processor is operable to perform actions under control of electronic program instructions, as will be described in further detail below, including processing/executing instructions and managing the flow of data and information through the system 10.

The server 12 includes a server operating system which is capable of issuing commands to access a plurality of databases or databanks which reside on the storage device thereof. In the embodiment, two such databases or databanks are provided, comprising: a blacklist database 34 and data store 36. The operating system is arranged to interact with the databases 34 and 36 and with one or more computer programs of a set/suite of server software to cause the server 12 to carry out the respective steps, functions and/or procedures in accordance with the embodiment of the invention described herein.

The computer programs of the server software set, and other electronic instructions or programs for the computing components of the system 10 can be written in any suitable language, as are well known to persons skilled in the art. In embodiments of the invention, the electronic program instructions may be provided as stand-alone application(s), as a set or plurality of applications, via a network, or added as middleware, depending on the requirements of the implementation or embodiment.

In alternative embodiments of the invention, the software may comprise one or more modules, and may be implemented in hardware. In such a case, for example, the modules may be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA) and the like.

The computing means can be a system of any suitable type, including: a programmable logic controller (PLC); digital signal processor (DSP); microcontroller; personal, notebook or tablet computer, or dedicated servers or networked servers.

The processor can be any custom made or commercially available processor, a central processing unit (CPU), a data signal processor (DSP) or an auxiliary processor among several processors associated with the computing means. In embodiments of the invention, the processing means may be a semiconductor based microprocessor (in the form of a microchip) or a macroprocessor, for example.

In embodiments of the invention, the storage can include any one or combination of volatile memory elements (e.g., random access memory (RAM) such as dynamic random access memory (DRAM), static random access memory (SRAM)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), etc.). The storage may incorporate electronic, magnetic, optical and/or other types of storage media. Furthermore, the storage can have a distributed architecture, where various components are situated remote from one another, but can be accessed by the processing means. For example, the ROM may store various instructions, programs, software, or applications to be executed by the processing means to control the operation of the device 12 and the RAM may temporarily store variables or results of the operations.

The use and operation of computers using software applications is well-known to persons skilled in the art and need not be described in any further detail herein except as is relevant to the present invention.

Furthermore, any suitable communication protocol can be used to facilitate connection and communication between any subsystems or components of the system 10, and other devices or systems, including wired and wireless, as are well known to persons skilled in the art and need not be described in any further detail herein except as is relevant to the present invention.

Where the words "store", "hold" and "save" or similar words are used in the context of the present invention, they are to be understood as including reference to the retaining or holding of data or information both permanently and/or temporarily in the storage means, device or medium for later retrieval, and momentarily or instantaneously, for example as part of a processing operation being performed.

Additionally, where the terms "system", "device", and "machine" are used in the context of the present invention, they are to be understood as including reference to any group of functionally related or interacting, interrelated, interdependent or associated components or elements that may be located in proximity to, separate from, integrated with, or discrete from, each other.

Furthermore, in embodiments of the invention, the word "determining" is understood to include receiving or accessing the relevant data or information.

The supply partner ad server 33 is operable to store advertising content used in online marketing and to deliver that content onto various digital platforms such as websites, social media outlets and mobile apps, accessible via suitable remote devices 26. The use and operation of ad server is well-known to persons skilled in the art and need not be described in any further detail herein except as is relevant to the present invention.

In the embodiment, input received by the system 10 comprises a data communication from a remote device 26, in the form of a click on advertising content (an ad) delivered to the remote device 26 and originating from the supply partner 33.

On receipt of the data communication, processing performed by the system 10 comprises an analysis to determine whether a first event or a second event has occurred, and initiation of a corresponding first action or a second action according to the determination made.

In the embodiment, the first event corresponds to the data communication originating from a legitimate client device 28, in which case the corresponding first action comprises the data communication (and legitimate client device 28 and user thereof) being communicated to the advertiser web server 32. The first action further comprises a further data communication in the form of a notification of user engagement being communicated from the advertiser web server 32 to the system 10, the system 10 undertaking an engagement analysis process resulting in a recording and scoring of the notification, and communicating the same to the supply partner 33.

In the embodiment, the second event corresponds to the data communication originating from a malicious device 30, in which case the corresponding second action comprises the data communication (and malicious device 30 and user thereof) being blocked. There is no communication with the advertiser web server 32 in the event that a click is blocked.

Alternative embodiments of the invention may comprise analysis to determine the occurrence of additional and/or alternative events, and the initiating of additional and/or alternative action(s) as may be appropriate according to the embodiments.

Figure 2:
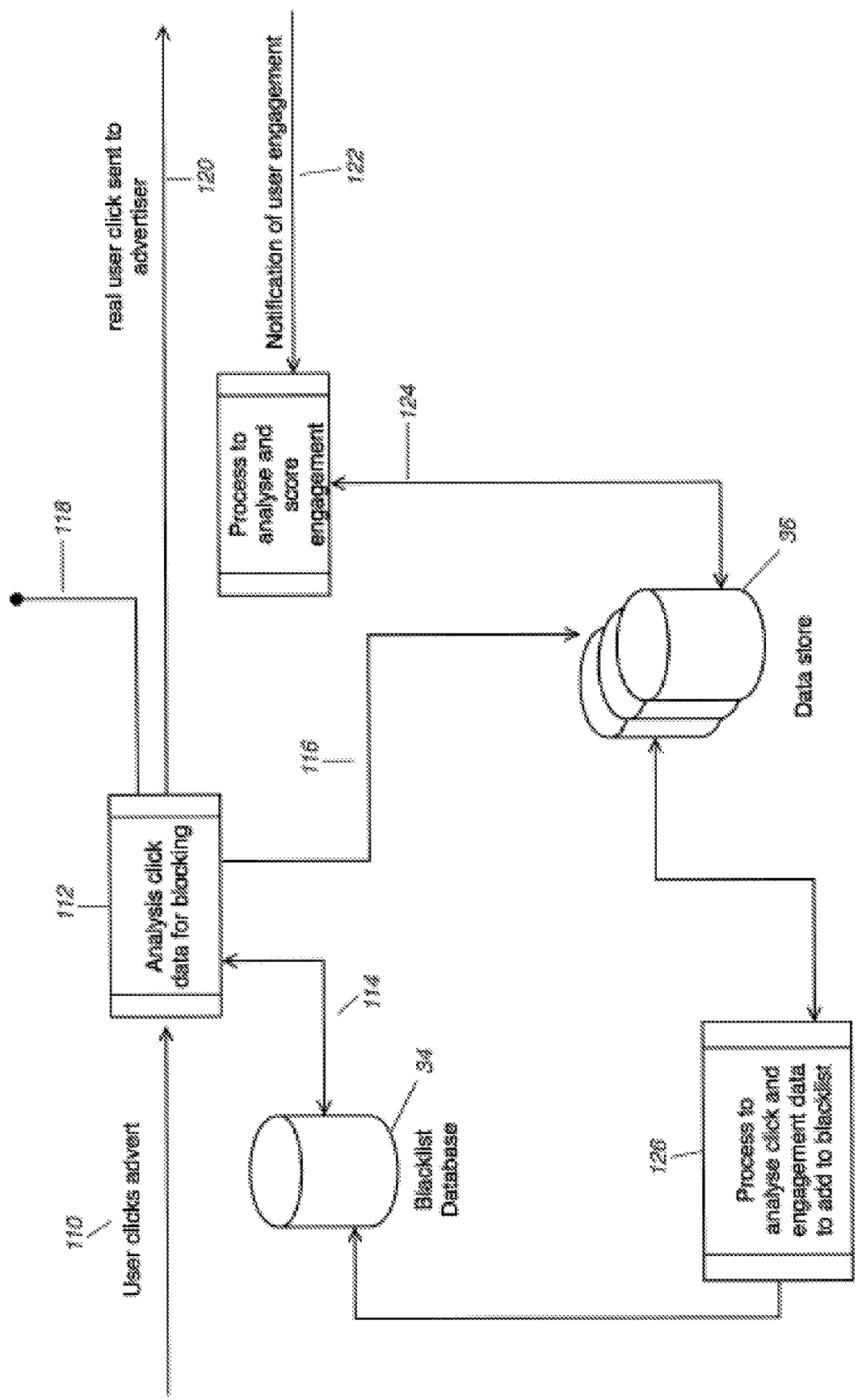
FIG. 2 depicts a flow chart of operations performed by the system of FIG. 1A in implementing an embodiment of a method in accordance with an aspect of the invention.

The processing that the system 10 is operable to perform is depicted in further detail in FIG. 2 of the drawings.

Referring to FIG. 2, at step 110 the user of the remote device 26 clicks on an ad. Data generated by action of the click is communicated and received by the system 10 as input. An analysis of the received click data for blocking purposes is then performed at step 112 by the system 10.

As part of the analysis, the system 10 is operable to compare, at step 114, the click data with or against data contained in the blacklist database 34. The system 10 is also operable, at step 116, to record the received click data in the data store 36.

If, as a result of the comparison, the system 10 determines that the click originated from a malicious device 30, the data communication is blocked as hereinbefore described, at step 118.

If, as a result of the comparison, the system 10 determines that the click originated from a legitimate client device 28, the data communication comprising the real user click is communicated to the advertiser web server 32 as hereinbefore described, at step 120. Only clicks that are not blocked are communicated to the advertiser web server 32.

Notification of subsequent user engagement is then communicated from the advertiser web server 32 to the system 10, at step 122.

The system 10 is then operable to perform the engagement analysis process resulting in a recording and scoring of the engagement, at step 124, taking into account data stored in the data store 36. Notifications of user engagements from the advertiser web server 32 are processed and stored in the same data store 36 that has the clicks data.

Furthermore, the system 10 is operable to process the click and engagement data, at step 126, and update the blacklist database 34 as a consequence of the processing as may be appropriate. As will be described in further detail, the combined click and engagement data is processed to generate new rules for the blacklist database 34.

The above operations are performed continuously by the system 10 in the embodiment as long as it is receiving click action communications from remote devices 26 and user engagement notifications from the advertiser web server 32.

In the embodiment, the system 10 comprises three operational facets collectively formed from the initial requirements hereinbefore described. These comprise a shield facet (pre-campaign) 38, a guard facet (active campaign) 40, and a watch facet (post-campaign) 42, as depicted in FIG. 4. These facets correspond to three stages of a campaign lifetime in which ad fraud can be mitigated, and work together in the embodiment of the invention to result in fraud mitigated, or quality, traffic.

As will be described in further detail, the shield facet 38 comprises a number of processes that the system 10 is operable to perform and which are focused around partner registration profiles and information based on data supplied during progression from a prospect to an active partner and input to the system 10. These processes include, but are not limited to, partner id verification, duplicate partner profile detection, partner profile scoring, unusual partner profile changes, and login pattern anomalies. The ultimate purpose of these processes is to prevent potential fraud before any traffic can be generated from an active partner account and for an alert to be quickly raised to any unexpected changes in information from an active partner profile. The key motivation behind the shield facet 38 is that it is always best to stop fraud from happening than it is to deal with it after it has happened. In other words prevention is better than cure.

Shield Facet 38 (Pre-Campaign)

Before any new advertising campaign is launched there are a number of related activities that take place, as the shield facet 38 of FIG. 4 depicts. Among these activities is included the following: i) initial screening of all new partner candidates; ii) continuous management of existing partners, including routine monitoring of their activity data; and iii) campaign specific targeting to enable detection and prevention of the so-called compliance fraud. These activities by the system 10 either do not use traffic data at all or use such data from past campaigns only, in the embodiment.

The embodiment of the system 10 advocates the idea that it is best to stop something bad from happening than it is to deal with it after it has happened. In other words, prevention is better than cure. With this in mind, the system 10 is operable to employ a sophisticated process for the initial screening of all new candidates to supply partners. A thorough procedure with a number of internal and external checks must be completed before a new partner is granted an account so they can send their first clicks to a campaign. The process is controlled by a system of states, as depicted in FIG. 7.

In the embodiment, the system 10 is operable to complement the ecosystem of the business system (or any similar third-party campaign optimisation solution) with machine learning and other techniques of advanced analytics. For example, regularly updated partner groups is an efficient approach to detect duplicated partner profiles early. This is especially efficient if the group contains previously rejected profiles. This and related initiatives allow the system 10 to flag potential threats at the earliest possible stages of the partner's life-cycle, before they can start sending any traffic to an advertiser's campaign. Regular monitoring of significant changes in partner names and partners login activities from countries other than the country stated in their registration profile are other examples of measures taken to protect the overall quality of partners by detecting anomalies in their behaviour, that the system 10 is operable to perform.

The system 10 is operable to determine a set of measures representative of attributes of a partner. In the embodiment described, one of these, for all registered partners, has the form of a partner profile score based solely on the information provided by the partner during their registration process. A system of penalties have been developed, and implemented by the system 10, to penalise a partner for the presence or absence of various attributes in their registration profile and follow up checks. For example, a penalty of 3 is attracted if a partner's stated contact email is a free email address, and no penalty is attracted if a valid commercial email is provided. If email is invalid, for example @ is missing, a penalty of 5 will be issued. The presence and validity of phone numbers, postal addresses and many other fields are also checked automatically by the system 10.

Partner profiles are then ranked by the total amount of penalties attracted, which is normalised into a score between 0 and 100, which is then visually represented by the number of stars between 1 and 10, all by action of the system 10. This score is updated daily and in real time if partner profile details have changed. This score was designed to reflect on the quality of partner before they could demonstrate their performance by supplying valid installs and conversions. This score can be used as an additional feature in multi-criteria decision making algorithms for partner ranking.

In alternative embodiments of the invention, additional and/or alternative measures representing attributes of a partner, determined by additional and/or alternative means, may be implemented.

As will be described in further detail, the watch facet 42 represents all of the processes of the system 10 that apply machine learning, pattern mining and other advanced analytics techniques to input comprising potentially much bigger datasets, which may often include traffic from many archived campaigns, to enable the system 10 to discover yet undetected types of fraud. This is also a place where all ad hoc requests for any fraud investigation for active or recently paused campaigns may be accomplished by the system 10. Once new IVT patterns have been detected and understood, the detection logic is added to the system 10 automatically so more fraud can be routinely blocked by the system 10. It is in this sense that the system 10 becomes "smarter" at detecting and blocking fraud and otherwise invalid traffic with every campaign run.

Watch Facet 42 (Post-Campaign Analysis)

Another set of activities which the system 10 is operable to perform is a set of analyses that are best performed when a campaign is archived, or paused due to reasons related to suspicion of IVT, as the watch facet 42 of FIG. 4 depicts. Among such activities is included the following: i) detailed analysis of each archived campaign's performance to identify general reasons for success or failure, focusing on possible invalid traffic that the system 10 failed to block; ii) continuous application of big data, advanced analytics and machine learning techniques to detect new types of IVT; and iii) ad hoc fraud investigations that advertisers can request any time, which automatically trigger a review of rules and actions of the system 10.

Understanding campaign performance can be critical for all stakeholders in the business. For example, if one of a set of performance criteria for the campaign is the conversion rate, there are multiple ways to improve it, including: increase the number of conversions, reduce the amount of clicks, do the two simultaneously, and increase or decrease the two with different rates, for example. Reducing the amount of likely fraudulent clicks communicated to the advertiser web server 32 via enhancing the blocking mechanisms of the system 10 together with finding new conversions with the business system (or any similar third-party platform) can be the most efficient approach to increasing revenues by optimising campaign performance.

While the embodiment of the system 10 aims at blocking all identified types of fraud in real-time, new types of fraud and/or sources of invalid traffic regularly emerge. It is thus very important to formally recognise activities directed specifically to searching patterns and anomalies in datasets combining traffic from active and archived campaigns. By employing multiple techniques of advanced analytics and machine learning on top of suitable big data solutions, new rules and actions for blocking invalid traffic can be obtained and deployed by a prevention subsystem 44, described in further detail hereafter. It is in this sense also, that the embodiment of the system 10 gets "smarter" with every campaign run. While most of machine learning and advanced analytics techniques can be used when campaign is still active, a great deal of complex algorithm can benefit from having as much data as possible, which is clearly at the end of any campaign.

At the end of any campaign, there are two potentially very large datasets of clicks (those that were communicated to the advertiser web server 32 and those blocked by the system 10), two datasets of conversions (those invalidated by system 10, for which the advertiser was not billed, and those validated by the system 10 as billable). Similar divisions of the data are available for installs and post-install events. Labelling blocked clicks (rejected installs, conversions) with 1 and everything else with 0 makes it possible for the system 10 to apply various supervised machine learning algorithms and provide a sensible approach for validating results obtained with machine learning algorithms when making use of unsupervised learning.

While trying to eventually minimize the number of ad hoc fraud investigation requests from advertisers, such analysis are extremely useful as they usually imply focusing on a relatively small portion of the recent data and often clearly specified concerns to verify. Such requests are a good opportunity to develop new tools and techniques so they can be later applied to more campaigns, which in turn can help specify new rules and actions to block invalid traffic in real time, to be implemented by the system 10.

As will be described in further detail, the guard facet 42, associated with the active phase of the campaign, combines all of the processes that use traffic data from active campaigns to routinely detect fraud and otherwise invalid traffic at various levels of the conversion funnel and prevent it from happening in the future by blocking it at the early levels of traffic monitoring, such as clicks and impressions. The guard facet 10 will be further described in the context of four interrelated and inter-operative subsystems of the system 10, as depicted in FIG. 5: the prevention subsystem 44, a detection subsystem 46, a monitoring subsystem 48, and a reporting subsystem 50.

Guard Facet 40 (Active Campaign Analysis)

Another of the set of measures that the system 10 of the embodiment is operable to determine comprises a partner (performance) score. In contrast to the partner profile score, the partner (performance) score was developed to reflect on the overall ability of the partner to maximise revenue and at the same time minimise fraud related adjustments, as based on the historical records of their performance for all past campaigns. The system 10 is operable to calculate this score based on input data comprising daily snapshots for a number of performance variables, such as click to install ratio, conversion rate, profit, and negative revenue adjustments due to fraud, for example. In the embodiment, the values are available for periods of time comprising the previous day, for the last 7 days, for the last 30 days and all available days. An aggregated version of these variables is calculated by the system 10 by taking their more recent values with greater weights. These aggregated measures of multiple performance criteria and some other quantities are then used by the system 10 with different importance weights and appropriate signs in an algorithm similar to The Technique for Order of Preference by Similarity to Ideal Solution (TOPSIS).

TOPSIS is a multi-criteria decision analysis method based on the concept that the chosen alternative should have the shortest geometric distance from the positive ideal solution and the longest geometric distance from the negative ideal solution. Once these distances are calculated, partners can be ranked by their performance, and the distance can be turned into a normalised score, from which the number of stars between 1 and 10 can be calculated to visually represent the expected quality of the partner, all by action of the system 10. The score is updated daily, following the daily update of the snapshots and other tables used for scoring, all by action of the system 10. This score is used by the system 10 in real-time scoring of clicks, installs and conversions to indicate the overall quality of partner.

Real-time analytics on the traffic from all active campaigns comprises a central piece of the guard facet 40 of the system 10. This analytics is powered by the four previously mentioned subsystems, namely the prevention subsystem 44, the detection subsystem 46, the monitoring subsystem 48, and the reporting subsystem 50, which respectively are ope0rable to execute or perform the prevention process, detection process, monitoring process, and reporting process, described herein.

These four major subsystems of the system 10 work in cohesion with one another to achieve the common goal of invalid traffic mitigation for all active campaigns in real time.

The prevention subsystem 44 is operable for and directed to blocking fraud and otherwise invalid traffic in real time at the early levels of user engagement, such as clicks and impressions.

The detection subsystem 46 is operable for and directed to detecting fraud and otherwise invalid traffic at all levels of user engagement (impressions, clicks, installs, post-install events, and conversions) and passing the insights, as detection process output, to the prevention subsystem 44 for blocking.

The monitoring subsystem 48 is operable for and directed to continuously supplying, as monitoring process output, of all the data required to support the advanced analytics and machine learning employed by the detection subsystem 46, automatic monitoring of the set expected performance indicators, and communicating monitoring process output with the prevention subsystem 44 in real time.

The reporting subsystem 50 is operable for and directed to efficient presentation of information, such as, for example, on blocked clicks, rejected installs, and communication of user-supplied rules, as report process output, to the blocking mechanism of the prevention subsystem 44 in real time.

Each of these four subsystems of the system 10 is associated with a number of key processes, as depicted in FIG. 8, which will be described in further detail hereafter.

Prevention Subsystem 44

The described embodiment of the prevention subsystem 44 is built around a number of functions or mechanisms that are operable to block all undesirable traffic at the click level. In alternative embodiments, blocking at additional and/or other levels may be provided for, such as at the impression level can be considered. The common goal here is to divert invalid traffic from its destination, usually an advertiser or their attribution partner, as early in the conversion funnel as possible, that is before the click is sent to an advertiser.

To this end, in the embodiment, a number of data enrichment processes are used and operable to transform or turn data, such as raw http header data (such as ip-address, user-agent) into more usable pieces of information (such as geographical location (in terms of longitude and latitude coordinates, city, region and country), device operating system (e.g. iOS, Android), browser (e.g. Chrome, Safari), browser version for example). This facilitates and enables both campaign targeting and compliance fraud prevention, where clicks from locations, devices, browsers etc not matching those specified for a campaign by an advertiser, are immediately blocked. In embodiments of the invention, suitable third-party solutions are used to facilitate blocking invalid traffic based on information available for particular ip-addresses and user-agent strings.

A more general tool of the system 10 for blocking unwanted traffic is the blacklist. In a nutshell, each time a click is received, a number of click attributes is available from http header and request URL components, including cookies, partner id, partner source id, campaign id etc. Clicks with any combination of these attributes can be blocked by matching these attributes against those available in Redis in-memory key-value store. Keys contain one or more attributes against each a blocking decision can be applied. Values contain particular instances of these click attributes, for example particular global user id, or the combination of a concrete ip address with a specific user agent string.

A Redis lookup is performed on the attributes of each incoming click to verify there is no blocking conditions for the clicks to go through. If a particular click attribute or set of click attributes is found to exist in redis datastore, the click is immediately blocked in the sense that it will never reach the advertiser. Instead, it can be redirected to an empty page or the so-called jump page, where additional information about clicks can be collected using java-scripts. This client-side information can then be combined with server-side information for further analyses, for example to detect false positive errors (when the system 10 blocked something that shouldn't have been blocked) and modify the blocking conditions accordingly. In the embodiment, blocked clicks (requests) are logged to S3 or similar cloud storage from where the data are readily available for further analyses.

Prevention Subsystem 44: Data Enrichment

The Hypertext Transfer Protocol (HTTP) for data communication uses numerous fields containing data about the nature of a transaction of data communication called "headers", which are separate from the transaction's content. One of these headers is the "User-Agent" header, which specifies the browser or application with which a user accessed their content via device 26. Another equally important field is the ip-address. For the system 10 of the embodiment to be able to use the data in these two fields most efficiently, it needs to be enriched.

IP lookups enrichment uses an IP intelligence database(s) to look up useful data based on a user's IP address. The database comprises three levels of detail, being City, Anonymous-IP and ISP The City database is used to provide the geographical location of the IP address at the city level (including higher levels of state and country) as based on the approximate latitude and longitude coordinate of the IP address. Another useful piece of information derived from the knowledge of approximate IP location is the time zone, from which user's local time can be calculated. Example 1, hereafter, shows these in lines 38-40.

Anonymous-IP database is used to detect various types of Internet anonymisers. Example 1 shows these in lines 53-57. The field is suspicious_ip in line 57 is a unidimensional representation of the four indicator variables in lines 53-56. The number of values that is_suspicious_ip can take is given by the sum of binomial numbers ($\binom{n}{k}$) with n=4 and k=1, 2, 3, 4, which is 16. These numbers provide a general answer to the question of how many ways can k be 1s (and not 0s) from n available variables (those in line 53-56).

The ISP database is used to provide internet service providers, autonomous system numbers and related information. Example 1 shows these in lines 58-60. These additional variables can be useful for certain analyses at levels less granular than individual IP-address, CIDR network block or rounding to the last or second last octet of an IPv4 IP address.

Device detection makes it possible to identify web-enabled devices requesting online content. Given that it is generally based on analysing User-Agent (UA) strings, it is often referred to as user-agent lookup, user-agent parsing or more generally user-agent analytics. Among the major reasons for performing mobile device detection are mobile web analytics (so as to obtain a detailed web traffic view including all details of visiting devices), mobile content optimisation (making sure that all users receive an optimal viewing experience) and ad targeting (where the knowledge of visiting devices allows to exclude all irrelevant traffic for a particular campaign).

UA lookups enrichment uses a proprietary ua-parser for device detection. The header of HTTP request generated by the device is extracted and the User Agent string parsed. The user agent request header contains a characteristic string that allows the network protocol peers to identify some of the device characteristics. Example 1 shows this string in line 17.

Next, the ua-parser uses a finely-tuned matching algorithm to identify the device and extract its "capabilities" (including, for example, device's operating system and its version, it's type, brand and model, the used browser and its version, screen resolution) from a data source. These device capabilities results are used to optimize traffic for a campaign. Example 1 shows UA lookups data enrichment in lines 18-34.

The user agent string format in HTTP, as specified by Section14.43 of RFC 2616 (HTTP/1.1), is a list of product tokens (keywords) with optional comments. These comments can contain information regarding bots, such as web crawlers and spiders, so this traffic can be omitted from further processing and analysis at the very early stage.

Prevention Subsystem 44: Campaign Compliance

Example 1 depicts a typical click tracking data record from a file stored on AWS S3 service or similar data store, including data obtained via IP lookups and UA lookups as hereinbefore described. In embodiments of the invention, these two data enrichment processes are critical for campaign targeting (as part of the business system or similar 3rd-party solution) and compliance fraud mitigation (as part of the system 10).

With this enriched http headers data received as input, the system 10 is operable to whitelist, or consider trustworthy, devices, browsers and countries that a particular campaign wants to target. Everything that is not found in the list is blocked to prevent the advertiser from any form of compliance fraud. Similarly, if the user agent field's contents are unknown, nonstandard or otherwise suspicious, the associated traffic is blocked by the system 10.

```
1 {
2 "id": 20329898354,
3 " uuid ": "0b00202c-6750-4342-9f0f-72c50ac6ca34",
4 " created_at ": "2018-01-04 05:59:58",
5 " campaign_id ": 1012421,
6 " affiliate_id ": 706250,
7 " advertiser_id ": 3035,
8 " sub_id ": "4611",
9 " carrier_id ": 1,
10 " session_id ": " lnkih 7h8j4 lbj 622 hst 95cf5m0",
11 " approved ": 0,
12 " billable ": 0,
13 " tracking_type_id ": 2,
14 " global_user_id ": "0500202c-67c2-4769-8900-0002000001cd",
15 " initial_tracking_id ": 20329898354,
16 " initial_tracking_uuid ": "0b00202c-6750-4342-9f0f-
72c50ac6ca34",
17 " user_agent ": " Mozilla /5.0 ( Linux ; Android 7.0; SM -
G930F Build / NRD 90M) AppleWebKit /589.36 ( KHTML ,
like Gecko ) Chrome /63.0.3239.111 Mobile Safari /537.36",
18 " device_type_id ": 4,
19 " device_os_id ": 3,
20 " device_os ": " Android ",
21 " device_os_version_id ": 3154,
22 " device_os_version ": "7.0",
23 " browser_id ": 38473,
24 " browser ": " Chrome Mobile 63.0.3239",
25 " user_agent_language_id ": 23,
26 " user_agent_language ": "fr -fr",
27 " resolution_width ": 1440,
28 " resolution_height ": 2560,
29 " xhtml_support_level ": 4,
30 " js_support ": 1,
31 " brand_id ": 11,
32 " brand ": "Samsung ",
33 " model_id ": 24018,
34 " model ": "SM -G930F",
35 " ip_address ": 1381495,
36 " country_id ": 145,
37 " country_name ": " France ",
38 " state_id ": 9224,
39 " state ": "Seine - Maritime ",
40 " city_id ": 215576,
41 " city ": "Saint - Étienne -du - Rouvray ",
42 " time_zone ": " Europe / Paris ",
43 " latitude ": 57.3779,
44 " longitude ": 12.1047,
45 " local_time ": "1979-01-04 06:59:58",
46 " weekday ": "4",
47 " referrer_domain_id ": 6964156,
48 " referrer_domain ": "sl. website .com",
49 " sid ": "4611",
50 " aff_click_id ": "6507071282490641400",
51 " additional_params ": "[ ]",
52 " is_anonymous_vpn ": 0,
53 " is_tor_exit_node ": 0,
```

-continued

```
54 " is_hosting_provider ": 0,
55 " is_public_proxy ": 0,
56 " is_suspicious_ip ": 0,
57 " campaign_target_category ": " App Install ",
58 " asn_number ": 3215,
59 " asn_name ": " Orange ",
60 " asn_isp ": " Orange "
61 }
```

In their *Invalid Traffic Detection And Filtration Guidelines Addendum* (15 Oct. 2015) document, Media Rating Council (MRC) separates invalid traffic (IVT) into two categories: General Invalid Traffic (GIVT) and Sophisticated Invalid Traffic (SIVT).

The former includes traffic identified through routine-based or list-based means of filtration—such as, for example, bots, spiders, other crawlers; non-browser user agent headers. The latter includes traffic identified through advanced analytics, multipoint corroboration, human intervention—such as, for example, hijacked devices, adware, malware, misappropriated content. In contrast to GIVT detection methods, SIVT detection methods are extremely proprietary and are not specified by MRC in detail.

Also, the system 10 is operable to identify and filter known data-centre traffic, which is any traffic that has been detected by IP address to originate in a datacentre. Datacentres have been determined to be a consistent source of non-human traffic, likely coming from a server rather than a laptop, smartphone, tablet or other mobile device. Exceptions include servers known to be acting as a legitimate access point for users, such as a corporate gateway, for example. Furthermore, the system 10 is operable to identify and filter bots, spiders and other crawlers that represent non-human activity on the web. In some circumstances, they are legitimate i.e. "good" bots—but they are still non-human nonetheless. Legitimate web crawlers may trigger ad impressions under certain circumstances and for this reason must be filtered out, in the embodiment.

As a component of the system 10, UA analytics (various analyses centred around useragent strings) performs the following important roles: (i) detecting suitable mobile devices to enable ad campaign targeting and mitigate compliance fraud; (ii) detecting bots/crawlers/spiders to perform pre-attribution filtering of clicks so that bot clicks never convert; (iii) providing enriched data for advanced analytics e.g. comparing distributions of browsers or browser versions in the traffic from publishers running a particular campaign to detect anomalies and potential fraud.

As a component of the system 10, IP analytics (various analyses centred around IP address) performs the following important operations: (i) performing IP geolocation lookups to enable ad campaign targeting and mitigate compliance fraud; (ii) performing anonymous IP lookups to detect bots and otherwise suspicious IPs as part of pre-attribution filtering of clicks so that bot clicks never convert; (iii) calculating IP risk score to block traffic from IPs with high risk score.

As a component of the system 10, referrer (domain) analytics (various analyses centred around url that sent a click) performs the following important operations: (i) performing referrer domain lookups to enable campaign targeting (e.g. no adult websites) and mitigate compliance fraud; (ii) calculating referrer domain risk score to filter out traffic from domains with poor reputation.

Prevention Subsystem 44: 3rd-Party Analytics

An additional level of defence employed by the prevention subsystem 44 is its ability to integrate with third party filtering solution(s). Such solutions are usually more complex than blacklisting and/or whitelisting of specific values of click attributes for campaign compliance, as described herein.

A third party analytics solution is capable of supplying a reputation score for each provided ip address in real time. In the described embodiment, upon receipt of such information as input, the system 10 is operable to then ensure that every click sent from ip addresses with the reported risk score exceeding a threshold is blocked and never reaches the advertiser. In addition to flagging traffic originated from high risk ip addresses, so it can be immediately blocked by the system 10, source risk ratio and sub-source risk ratio features provided by a third party can be used by the system 10 to detect partners and partner sources of suboptimal quality.

Similarly, the embodiment of the system 10 obtains a technical and competitive advantage by making use of a regularly updated and accurate database on bots, and the ability to identify them in real time, as provided by DeviceAtlas (https://deviceatlas.com/bot-detection). DeviceAtlas contains extensive information on bots and provides device intelligence on mobile and web-enabled devices with a high-speed API capable of making millions of device detections per second.

More often than not some complex analytics continuously performed by third party solutions is delivered through regularly updated lists of, for example, blacklisted ip addresses, referrer domains. Such blacklists are available from the Interactive Advertising Bureau (IAB), the Trustworthy Accountability Group (TAG), the Media Rating Council (MRC) and other advertising business organizations that develop industry standards, conducts research, and provides legal support for the online advertising industry.

Prevention Subsystem 44: Blacklist Blocking

Traffic matching blacklisted attributes is then blocked by the system 10 in the same way as how traffic not matching campaign compliance requirements is blocked in real-time. A simple logical diagram depicted in FIG. 9 illustrates the process of blocking traffic based on black and white lists performed by the system 10.

Referring to FIG. 9, at step 210, data generated by action of a click when the user of the remote device 26 clicks on an ad is communicated and received by the system 10 as input. An analysis of the received click data for blocking purposes is then performed at step 212 by the system 10.

As part of the analysis, the system 10 is operable to compare the click data with stored blacklist and whitelist rules to determine whether it should be blocked or not.

If, as a result of the comparison, the system 10 determines that the click should be blocked, at step 214, it is operable to record the block, at step 216, and block the data communication of the click, at step 218.

If, as a result of the comparison, the system 10 determines that the click should not be blocked, at step 220, it is operable to record the click, at step 222, and allow the data communication of the click to the destination, at step 224.

To seek to overcome the problem of receiving too much traffic exhibiting clearly non-human behaviour, data-driven blacklist functionality of the system 10 has been developed and is implemented therein. This functionality is operable for and directed to blocking fraud or otherwise invalid traffic in real time and at the early levels of the user engagement, seeking to address item 4 in the list of initial system requirements hereinbefore. Among all of the blacklists that the embodiment of the system 10 employs, this blacklist is by far the most general and dynamic source of information for blocking invalid traffic. It contains continuously updated rules that specify what traffic to block and for how long.

Analysis undertaken by the system 10 to determine which incoming clicks are to be blocked comprises comparing the click's http request's header information with the available blacklist and whitelist records in the blacklist database 34. The header details of the input data received and used by the system 10 for this comparison include: the request's ip address, the user agent, the referrer, cookie data, and request query string parameters identifying the click's source, the sub-source, and the campaign. Clicks and blocks are recorded by the system 10 for future analysis and reporting. If clicks pass the established validation process the system 10 is operable to pass the request on to, the advertiser web server 32, as depicted in FIGS. 1A, 2, and 9 of the drawings.

In the embodiment, the blacklist and whitelist records are available from Redis in-memory data store, by importing them from multiple other databases every 5 minutes. As Redis is optimised for speed and performance all the required lookups takes an extremely short amount of time so decisions can be made by the system 10 in real time. As hereinbefore described, in the embodiment, some of the features the blacklist rules are based upon or require some form of temporary aggregation of the traffic, so some delay will be present. Nonetheless, some other rules, like those defining ad stacking, can be processed with zero delay by the system 10 of the embodiment.

Detection Subsystem 46

The main purpose of the detection subsystem 46 is two-fold. Firstly, it is operable to detect invalid traffic at all levels of the conversion funnel (or all consecutive layers characterising different stages of user engagement), specifically impressions, clicks, installs, post-install events, and conversions, in the embodiment. Secondly, it is operable to translate the insights obtained into rules and actions that can be used to block traffic at the earliest levels of the conversion funnel, where the prevention subsystem 44 operates, as shown in FIG. 6 of the drawings.

To introduce further terminology, any individual measurable property or characteristic of a phenomenon being observed may be referred to as a feature. Any one or more features can be turned into a rule by specifying one or more threshold values or matching conditions to isolate the cases of interest. Any rule obtained this way can be associated with a particular action. In general, the set of available actions at each level of data monitoring will be different. In the embodiment, blocking is only available for clicks or impressions. Installs and conversions can be rejected but cannot be blocked. To apply a penalty to an individual install or conversion is another action that can be performed based on rules defined atop features.

Penalising installs and conversions is central to scoring in the embodiment so a case that attracted substantially larger amounts of total penalties can be rejected. For example, an impossibly low time to install of less than 10 seconds clearly indicates fraud (click injection) so installs flagged by this rule can be rejected immediately. On the other hand, an unusually large time to install can indicate either fraud (click spam) or genuine install where first opening just happened to be much longer after install than for the vast majority of users. As in this case it is impossible to reliably tell fraud from valid installs, immediate rejection is not applicable. Instead, a penalty of certain specified amount can be applied to this install to let it stand out from the rest of installs.

If we process the penalties associated with actions for all the rules defined at any level of the conversion funnel, chances are that fraud will reveal itself via substantially larger totals of attracted penalties. A threshold can then be set up, and any install that will exceed it will be rejected. There are thus two ways to reject or invalidate any install or conversion: immediate rejection (for example, out of geographic location, impossible low time to install) and rejection via scoring. Anything with zero or sufficiently small amount of penalties will be validated as genuine installs or conversions.

Another important mechanism within the detection subsystem 46 is aggregation logic that translates rejected installs, conversions etc into rules and actions that can be used to block traffic at the click level. In a simple form, this aggregation logic is operable to count the rejected installs by one or more click attributes against which blocking can be applied in the hope to detect abnormally high counts for particular values of the click attributes. Examples of such attributes include ip address, partner id, partner source id, user agent.

More involved or sophisticated forms of this aggregation logic may include machine learning and pattern recognition techniques, the common goal being to detect offenders at higher level of aggregation (for example, ip address, partner source id, partner id, referrer domain) from more granular data (for example, individual clicks, installs, conversions). Examples of this translation mechanism and aggregation logic in action to detect IVT at various levels of data monitoring are provided in further detail hereafter.

The translation mechanism explained above provides a feedback loop that connects advanced analytics techniques employed by the detection subsystem 46 at each level of the user engagement to the real-time blocking mechanism of the prevention subsystem 44 that operates at the early levels of user engagement (i.e. the click level for the described embodiment of the system 10). This enables the system 10 to detect invalid traffic at all levels of data monitoring and block it as early as possible, thereby protecting the advertiser from attributing installs and conversions to fraud and otherwise invalid traffic.

Detection Subsystem 46: Clicks Analytics

Unlike the prevention subsystem 44, in the embodiment the detection subsystem 46 of the system 10 operates at all levels of user engagement: impressions, clicks, installs, post-install events and conversions. As depicted in FIG. 8 of the drawings, there are two channels via which invalid traffic can be blocked by the system 10 at the level of clicks and impressions: immediate blocking or blocking via a scoring algorithms, including those that involve machine learning and other advanced analytics techniques.

On the one hand, a significant amount of invalid traffic can be immediately blocked with relatively simple deterministic rules that leave little to no doubts that blocked clicks were sent by a system other than a genuine user interested in the app advertised. Such deterministic rules, implemented in and operable to be performed by the system 10, enable identification of various non-human activities.

This is often called "activity-based" filtration. Legitimate users behave in unpredictably predictable ways. One can never be quite sure what, when, or where a legitimate user will click or go next, but they can be sure that legitimate users will not do the same, monotonous routine over and over again—the same way each and every time. They can also be sure that legitimate users will not click abnormally fast, or will be clicking at exact, 10-second intervals, for example. Activity-based filtration is the measurement of user activity to flag clicks that are too fast, too repetitive, at precise intervals, or are missing key pieces of data standard to valid internet traffic.

On the other hand, scoring algorithms can be useful when there is less certainty that a particular click should be blocked as invalid. These scoring algorithms, implemented in and operable to be performed by the system 10, include standard methods of machine learning capable of predicting either the value taken by the label itself or the probabilities with which the label is expected to have a certain value. Unsupervised machine learning techniques could also be used in embodiments of the invention to detect anomalies by returning either an anomaly score or the so-called reconstruction error when deep learning auto-encoders can be trained to approximate the good part of the traffic.

Yet another opportunity, which may be implemented in embodiments of the invention, is to consider the outputs of different machine learning algorithms as input features to a scoring system based on penalties and rewards. If a relatively unstable technique flags a particular click as anomalous, a smaller penalty is attributed to the click. If a couple of more stable and trusted algorithms do not flag the click as anomalous, the total penalty already attracted will not be sufficiently high to warrant blocking of this particular click. The total penalty will be below the threshold set to automatically block the traffic that attracted more penalties.

The advantage of this type of scoring is that any number of advanced analytics techniques can be used alongside less formal heuristics and other rules of thumbs to try and separate good traffic from the bad one. Once labels are established, various standard supervised and semi-supervised machine learning techniques can be used on top of this scoring framework to automate the click validation process. The set of features used need not be identical to those originally used to penalise clicks, and can be automatically extracted from data using auto-encoders, which can learn compact representation of the data known to represent the good traffic.

Detection Subsystem 46: Install Validation

As depicted in FIG. 6, there are two channels via which the system 10 is operable to invalidate each particular install: installs rejected immediately and installs rejection via scoring. The system 10 is operable to use the former channel when there is a high certainty that a particular set of values of a particular feature may indicate fraud. A very small time to install, of say ten or less seconds, is a good example of such a situation. There is little point in scoring an install when it is clearly impossible for the normal user to first download, and then install and open an app of even a smaller size for less than ten seconds. The system 10 is operable to recognise this.

While checking just one attribute could sometimes be enough to invalidate an install immediately, more often than not some sort of scoring across multiple features may be required before an install can be reliably invalidated. This is where the other channel comes in and is used by the system 10. Everything written on scoring in the previous section applies here too.

Continuing with the time-to-install example, it is desirable, and the system 10 is operable, to penalise each install if its realised time-to-install value is outside the range of the expected time-to-install values for a particular campaign. While particular implementations of this idea may differ, the common logic is to first establish the data-driven norm at the campaign level and then compare the values of each individual installs with this norm.

For example, the campaign-level norm can be specified in the system 10 with 10's and 90's quantiles of the distribution of all time-to-install values currently available for a campaign. Every install with time-to-install values to the left of the 10's quantile mark and to the right of the 90's quantile mark will be penalised by the system 10. In general, the amounts of penalties will be different, as outliers on the left are more certainly to be due to fraud (click injection) than the outliers on the right.

The outliers on the right can be either due to fraud (click spam) or due to a legitimate but relatively infrequent case when a genuine user installed the app in the morning but then first-opened it only in the evening. There is no way one can tell between these two cases based on this single feature alone. Hence scoring, where any number of features can be used to distribute penalties and rewards based on realised values of each feature.

As every feature is associated with a fixed penalty (in some cases fixed maximal penalty), in the embodiment, a maximum overall possible penalty can be calculated. Then all penalties and rewards for every install can be summed up (with rewards taken a negative sign) and normalised as the percentage of the maximal overall possible penalty. Note that mutually inclusive penalties (i.e. an install can get penalised as an outlier on the left, or on the right, but not both) should not be summed, as it's impossible to get both. Instead, the maximum of the two should be considered when calculating the total overall possible penalty.

The set of actions described above should result in a score between 0 and 1 so a suitable threshold of say 0.7 can be set up to automatically reject every install with the score exceeding this threshold of 0.7. The rejected installs can be further analysed across their various attributes to see if blocking rules should be added to data-driven blacklist. For example, it can be found that over 40 per cent of all rejected installs are associated with just two ip addresses. The ip addresses of these installs and the ip addresses of the attributed clicks (if different) should be blocked. This is an example of a feedback loop that connects the advanced analytics of the detection subsystem 46 with the blocking mechanism of the prevention subsystem 44 in real time in the system 10.

Detection Subsystem 46: Conversion Validation

Conversion validation performed by the system 10 is very similar to install validation described above. There are two channels via which the system 10 is operable to invalidate each particular conversion: conversions rejected immediately and conversions rejection via scoring. Immediate reject is triggered when clearly impossible values of the features are encountered. For example, very low values of the time-to-convert feature may clearly indicate fraud, whereas time to convert outliers on the right may be or may not be due to fraud.

Each particular feature can suggest its own definition for a set of values defining the norm for a particular campaign. Ideally, this campaign-level norm is data-driven in the sense that it gets updated as new data becomes available. For the conversion rate, where only relatively small number of data points are available, the campaign-level norm could be specified by the robust methods of outlier detection in unidimensional data, such as those based on median absolute deviation (MAD) or inter-quartile range (IRQ).

The lower and upper bounds associated with the above approaches will define the norm against which the conversion rate of each partner will be compared. In this case, outliers above and below the median will be equally penalised, as a conversion rate that is too high is likely due to incentivised traffic, and a conversion rate that is too low is one of the defining characteristics of click spam and otherwise not attractive.

This approach assumes that if everyone is doing poorly for a particular campaign, no-one gets penalised for the poor performance. Penalties are only attracted by outliers that is the case sufficiently above or below the general level of conversion rate for the campaign. Another feature can be established to penalise conversions based solely on the expected partner's conversion rate. This way, outliers below the median are likely to attract more penalties, until another feature is employed to also penalise conversions from partners with a particularly high levels of conversion rate.

Detection Subsystem 46: Data-Driven Blocking Rules

While global user ids and fingerprints are very granular levels of blocking, the ultimate purpose of any fraud detection system is to find a way to eradicate the root source of invalid traffic. In a mobile ad environment this means either a partner's source or the entire partner that needs to be blocked for a campaign or across related campaigns. It is convenient to distinguish between data-driven blacklist of blocking rules and user-given blacklist of blocking rules. In the system 10 of the embodiment, the user-given blacklist is synced with data-driven blacklist a prescribed period of every 5 minutes, so one and the same blocking mechanism is applied to both sets of rules. Like with the data-driven blacklist, every record in the user-given blacklist comes with a specific reason id so that granular reporting and further analyses are possible. A single database table is used for all the records of what historically was blocked by the system 10.

In the embodiment, the data-driven blacklist comprises multiple rules designed to flag clicks that trigger some specific conditions. Perhaps the simplest example of such triggers is the click rate, i.e. the number of clicks per some fixed interval of time. Most of these rules are designed to filter out clicks that deviate significantly from the expected behaviour of a typical user. For example, it is not reasonable to expect that a normal user would be clicking on the same ad three times per second or five times per minute. It should be then reasonable to conclude that if this traffic is atypical of the expected behaviour of the normal user, it should be blocked as invalid.

Certain types of mobile ad fraud can be readily blocked in real time. A good example here would be the type of mobile ad fraud often referred to as ad stacking. This fraud can readily be detected and prevented in real time by the system 10 being operable to count the number of unique ads for different campaigns a particular user has clicked at any given second. If the count exceeds one, ad stacking is by definition in place, and the system 10 is operable to immediately identify what partner sources or what ip address or a set of ip addresses should be blocked. If the source is blocked for an hour, the detection query need only be run once an hour.

In the embodiment, many other rules governing operation of the system 10 are based on some form of temporary aggregation of the traffic so they can still be used in real-time but with a fixed and short delay in time. FIG. 10 of the drawings depicts an exemplary list of rules applied for example every 15 minutes to all the tracking data received over this period. The list is not exhaustive as new and more refined blacklist rules can be added any time. The example shows twelve rules (with reason ids in red) grouped by the level of blocking: global user id, ip address, fingerprint, and so on. In this context fingerprint means the combination of values across these six attributes: campaign, partner, partner's source, ip address, referrer domain and user agent. The word gluser is short for global user id, which is a long term cookie (with a 2-year expiration period) that the business technology (or any similar platform) can drop.

In the system 10, the above rules are implemented with Structured Query Language (SQL) but more involved rules may require the use of R, Python or a similar programming language widely used for advanced data analysis. In any case, in the embodiment, the process comprises three stages which the system 10 is operable to perform: periodic reading of tracking data (for example every 15 minutes, using the tumbling window approach), running some code to identify the cases triggered by the rules, and writing the flagged values of the required attributes into another database table, for example AWS S3 or an alternative implementation of some suitable storage solution. In the embodiment, this storage solution may be referred to as the blacklist table. It is convenient to write the flagged values of the required attributes as a JSON array, as the number of required attributes depends on the level of blocking implied by the rule. FIG. 9 depicts a few examples of such arrays.

These flagged values of the required attributes inform the preventing subsystem 44 of the system 10 what to block and for how long. For example, if blocking is expected at the ip address (global user id) level, the only attribute for the blacklist table is ip address (global user id). If blocking is to occur at the fingerprint level, the required attributes are campaign, partner, source, ip address, referrer domain, global user id: every flagged combination of the values across these six attributes will be blocked for the time specified. Blocking in this case of the embodiment means that the advertiser will never see the clicks with values of attributes matching those flagged values of global user id, ip address or fingerprint. The system 10 is operable so that traffic blocked as triggering blacklist rules is rerouted to a web page where additional information of the clicking device can be collected, usually via javascript code installed on that page. Enriched data is then stored in log files on data store, from where blocked traffic can readily be accessed for the purposes of monitoring, reporting and further analysis.

Monitoring Subsystem 48

The monitoring subsystem 48 comprises one or more data stores, in the form or multiple snapshot tables in the embodiment that are updated with varying frequencies, such as every 24 hours, every 3 hours, every 1 hour, etc. These data tables (for example, in Redshift tables) and data stores (for example, Redis) are used to provide up-to-date data required for blocking, rejecting and scoring decisions. In addition to powering system 10 decisions, the monitoring subsystem 48 is operable to provide information to power blocking decisions based on Key Performance Indicators (KPI)s an advertiser can set up for any campaign.

Combining the two is a unique feature of the system 10, as continuously filtering out traffic sources that fail to meet specified KPIs will also filter out potential fraud, at least to some extent. For example, very low conversion rate or larger numbers of clicks to install ratio is one of the necessary symptoms of click spamming. At the same time, advertisers can state a threshold on these metrics to specify which installs and conversions they should not be billed for. It is in this sense that blocking poorly performing traffic and blocking invalid traffic from reaching the advertiser overlap at the tasks of performance monitoring, campaign optimisation and business reporting, as shown in FIG. 3 of the drawings. This overlap does not prevent embodiments of the invention from functioning on its own as a service, as advertisers KPIs can be implemented as part of embodiments of the invention.

Monitoring Subsystem 48: Snapshots and Aggregates

The purpose of the monitoring subsystem 48 is, and it is operable, to continuously supply all of the data required to support the advanced analytics and machine learning employed by the detection subsystem 46, perform automatic monitoring of the set expected performance indicators, and communicating with the prevention subsystem 44 in real time. The monitoring subsystem 48 in the embodiment comprises multiple snapshot tables (or more generally data stores) that are updated with varying frequencies, such as every 24 hours, every 3 hours, every 1 hour, for example. These data tables (for example, in Redshift tables) and data stores (for example, Redis) are used to provide up-to-date data required for blocking, rejecting and scoring decisions undertaken by the system 10.

Monitoring Subsystem 48: Performance KPIs

In addition to powering system 10 decisions, the monitoring subsystem 48 is operable to provide information to power blocking decisions based on Key Performance Indicators (KPI)s an advertiser can set up for any campaign. Combining the two is a unique and advantageous feature of the system 10 of the embodiment, as continuously filtering out traffic sources that fail to meet set KPIs will also filter out potential fraud, at least to some extent. For example, very low conversion rate or larger numbers of clicks to install ratio is one of the necessary symptoms of click spamming. At the same time, advertisers can state a threshold on these metrics to specify which installs and conversions they should not be billed for.

It is in this sense that blocking poorly performing traffic and blocking invalid traffic from reaching the advertiser overlap at the tasks of performance monitoring, campaign optimisation and business reporting, as depicted in FIG. 3. This overlap does not prevent the system 10 from functioning on its own as a service, as advertisers KPIs can be implemented as part of the system 10. Looking at the post-install events benefits the fraud detection efforts immensely, as the higher up we go in the conversion funnel, the more difficult it becomes to fake human behaviour.

Monitoring Subsystem 48: KPI-Based Blocking Rules

Failing one or more measures of performance expectations set for a campaign can be among the reasons for the system 10 to block a particular source of traffic, be it a specific partner source or entire partner. While these KPIs are not directly relevant to fraud and otherwise invalid traffic detection, they indirectly help protect advertisers from receiving invalid traffic. For example, very low conversion rate, or very large number of clicks per install, are signs of click spamming. As blocking the underperforming partner sources for poor performance is likely to block some of the invalid traffic too, the KPI-based blocking rules can be considered an additional layer of defence against IVT.

One of the main features of the monitoring subsystem 48 of the embodiment described herein is the feedback loop that connects the analytics of the monitoring subsystem 48 with the real-time blocking mechanism of the prevention subsystem 44. Once it is clear that a particular KPI or set of KPIs has not been met by a partner or partner source, a corresponding blocking rule can be sent to the prevention subsystem 44 to block this partner or partner source for this particular campaign. The system 10 is operable so that all of these can be done automatically and at scale, across all the active campaigns.

Reporting Subsystem 50

The reporting subsystem 50 is comprised of various tables, charts and dashboards that summarise the information on IVT detected and blocked and that the system 10 is operable to visually represent via the display 18. This can have any number of different implementations, which can also be different depending on whether the system 10 is used with the business technology, as in the described example, or as an independent service subscription, for example. A key functionality relevant to the described embodiment resulting in the reporting being different from other report implementations is a feedback link to the prevention subsystem 44 that is operable to automate creation of user(or human)-supplied rules for immediate blocking of unwanted traffic at the click level.

These human-supplied rules are implemented in addition to the data-driven rules that trigger blocking based on specific patterns in the data. These additional rules are more general as they can be based on considerations not limited to those obtained from data, but also more narrow in the sense that they will usually use fewer attributes against which any blocking decision can be applied. Examples of such attributes include partner id, referrer id and ip address.

Reporting subsystem 50: Invalid Traffic Reports

A set of invalid traffic reports is a component of the reporting subsystem 50 of the system 10 that is directed to, and operable for, the efficient presentation of information on blocked clicks, rejected installs, conversions, for example. In embodiments of the invention, individual reports can be implemented using a great variety of software (e.g. Tableau, R, Python) and the number of them grows with time. Some general points can be mentioned.

For the purpose of reporting, numerous signal types, features and reasons used for blocking or rejecting traffic can be combined into a smaller number of types and categories. This reduction step is important for at least two reasons. First, as the number of rules and conditions for blocking invalid traffic will be constantly increasing, it is useful to keep the report structure fixed for some longer period. Second, as these reports are expected to serve a variety of business users, it is best to use non-technical and easily understood language when summarising often quite technical description of blocking rules and trigger conditions that were actually used to block traffic.

In the embodiment of the system 10 used with technology of the business, the reporting subsystem 50 is directed to, and operable for, communicating information compiled as a result of data analysis, familiarise the network team with IVT and provide them with information to power their discussions with supply partners, monitor stability of the system 10 and help consolidate insights into an action plan directed to improving the efficiency and efficacy of the entire system 10.

In alternative embodiments of the invention, the reporting subsystem 50 of the system 10 may emphasise different things (for example, in embodiments where is provided in a SaaS mode).

In the described embodiment, the reporting subsystem 50 is operable to generate and present to a user an interactive dashboard via the display. In the embodiment, the dashboard is highly customisable to report on any combination of campaign, partner and partner-source over any past time period of interest. It also contains multiple tabs to highlight various aspects of reporting. For example, the total counts of IVT by more granular reasons and signal types.

For the purpose of reporting, numerous signal types and reasons may be combined into a smaller number of IVT types rules. This reduction step is important in the embodiment for at least two reasons. First, as signal types and conditions are continuously increasing, it is useful to keep the report structure fixed for longer period. Second, as actions are expected from a variety of business users, it is useful to use non-technical and easily understood language when referring to categories.

The following broader IVT types are used in the system 10 reporting: (i) non-human (ii) behavioural (iii) compliance (iv) error (v) sid flooding (vi) blacklist. Anything that is not falling in those categories is deemed as non-suspect in the embodiment.

Some of the above types combine many quite different things so it is useful to consider them in more detail. The lists below illustrate some examples of the rules. As there will always be multiple ways to meaningfully combine individual reasons and signal types, the described reporting structure should not be considered fixed. For example, while IVT type sid flooding is a separate category, it can be merged into IVT type Compliance.

IVT type Compliance include all signals of type filter and signals of type error or filter with reasons like: (i) filtered by device (ii) filtered by state (iii) filtered by platform (iv) filtered by device brand (v) filtered by platform version (vi) filtered by device model (vii) advertiser ip not allowed (viii) cap reached (ix) rejected campaign aused (x) rejected campaign archived (xi) pixel not approved (xii) user country not approved (xiii) partner not active (xiv) campaign not active (xv) duplicate conversion (xvi) duplicate click_id (xvii) lookback exceeded.

IVT type Behavioural include all signals of type waf signals of type error or filter with reasons like: (i) click filtered quality duplicate click limit (ii) most reasons from signal type WAF.

IVT type Error includes all signals of type error and signals of type filter with reasons like: (i) inactive campaign (ii) missing campaign_id (iii) inactive campaign-partner relation (iv) incorrect click_id (v) missing click_id (vi) missing partner_id (vii) empty carrier (viii) pixel not set up.

IVT type Non-human includes all signals of type bot and signals of type error or filter with reasons like: (i) click filtered quality suspicious ip (ii) Forensiq high risk visitor (iii) click filtered quality duplicate click limit.

Other examples of tableau dashboards include Human vs Bot report, Blacklist, Time to install report. There are also reporting aspects implemented in R and Python. The role of all these reports is essentially the same: to communicate information compiled as a result of data analysis, familiarise users, for example such as a network team, with IVT and provide them with information to power their discussions with partners, monitor stability of the system 10 and help consolidate insights into an action plan to improve the efficiency and efficacy of the system 10.

Reporting Subsystem 50: User-Given Blocking Rules

Regardless of the mode the system 10 is available for use, a second important role of the reporting subsystem 50 is to communicate user-given rules to the blocking mechanism of the prevention subsystem 44 in real time. These rules are used in addition to data-driven rules to block unwanted traffic at the click level based on considerations not limited to those derived from data. The user-given blacklist may, for example, comprise a Campaign Blacklist, where users of the system 10 can select one or more sources of traffic, or particular ip addresses to be blacklisted for a specific campaign. To simplify the process of blocking across multiple campaigns the same functionality may be implemented at the advertiser level in an Advertiser Blacklist. This blacklist allows users to block particular traffic sources or ip addresses for all of advertiser's campaigns or for all campaigns associated with a specific app.

In the embodiment, there is no restriction as to why and how particular traffic sources or ip addresses are added to the blacklist. For example, the decisions can be made based on the conversion-related metrics, such as the conversion rate, or event-related metrics, such as user app activity over time. These metrics will typically be much better indicators of the quality of app installs delivered by a particular traffic source and thus the quality of the traffic source itself. By looking at the post-install statistics it is often easier to identify fraudulent patterns. Looking at the post-install behaviour reports and at the same time being able to immediately block sources of invalid traffic will benefit the fraud detection efforts immensely, as the higher up we go in the user engagement funnel, the more difficult it becomes to fake human behaviour.

Given it is sometimes difficult to capture all invalid traffic with automatic data-driven rules, the ability for a user to immediately block the sources of unwanted traffic, while examining IVT and other reports, constitutes a feedback loop that connects the reporting subsystem 50 of the system 10 with the blocking mechanism of the prevention subsystem 44.

Advantageously, the system 10 is operable to block click at the early levels of the conversion funnel rather than just scoring them.

Adding the feedback links from each layer of the detection subsystem 46 operating at all levels of the conversion funnel to the prevention subsystem 44 operating at the click level of user engagement is advantageous. While these solutions are central to the system 10, they only operate within a single facet, namely the guard facet, in the embodiment described. The system 10 is more general, as additional fraud preventive measures are implemented within the shield facets and additional detection solutions are constantly being developed within the watch facets thereof.

Despite the fact that the system 10 was originally designed to complement the business technology, the two platforms tend to become a single whole in the embodiment, given the severe negative impact of fraud on the mobile advertising industry and the widespread use of advanced analytics and machine learning to detect anomalous patterns in ever growing data. Nonetheless, embodiments of the invention can be fully functional on their own, as independent systems capable of detecting and preventing various types of invalid traffic for ad networks other than those owned by the business. Such networks can employ solutions other than the business technology to source optimise their traffic but they still can benefit from embodiments of the invention provided as a service.

In fact, software as a service (SaaS) can be a suitable licensing and delivery model for embodiments of the invention. In this model, software is licensed on a subscription basis, centrally hosted and accessed by users via a thin client. SaaS has become a common delivery model for many business applications, fraud mitigation platforms included.

With a real-time and scalable fraud prevention and a multi-layered approach to fraud detection through an effective mix of in-house and third-party solutions, embodiments of the invention enable continuous supply of a high-quality traffic. The more data systems according to embodiments of the invention process, the smarter they get in the task of fraud detection.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

The claims defining the invention are as follows:

1. A method for mitigating fraud, the method comprising:
storing on a database, electronic program instructions for controlling an advertiser server with a processor and controlling the processor via the electronic program instructions;
receiving input data from a local device in response to a selectable advertisement transmitted from the advertiser server to the local device, wherein the input data comprises a selection of the selectable advertisement;
comparing current attributes of a source of the input data with known attributes of known sources to determine if certain behavioral anomalies of the source of the input data exists;
wherein the known attributes comprise identifying data of the known sources including demographic origins and activities of the known sources based on registered profile information, wherein the registered profile information includes duplicate profile detection, unusual profile changes, and login pattern anomalies;
detecting if the source of the input data is a malicious source or legitimate source based on an analysis of an existence of the determined certain behavioral anomalies and the comparison of the current attributes and the known attributes;
storing in an advertiser database the comparison of the current attributes of the source of the input data and the known sources and the determination if certain behavioral anomalies of the source of the input data exists;
performing a prevention process if it is determined that the source of the input data is the malicious source, wherein the prevention process comprises blocking the selection of the selectable advertisement to be transmitted to the advertiser server to prevent displaying the selectable advertisement on the local device;
generating a fraud mitigated output if it is determined that the source of the input data is the legitimate source, wherein the prevention process comprises allowing the selection of the selectable advertisement to be transmitted to the advertiser server to allow displaying the selectable advertisement on the local device; and
using the comparison of the current attributes of the source of the input data and the known sources and the determination if certain behavioral anomalies of the source of the input data exists stored in the database to enhance the prevention process when detecting the malicious source.

2. The method for mitigating fraud of claim 1, further comprising controlling the advertiser server with the processor via the electronic program instructions to perform a monitoring process using the fraud mitigated output to generate a monitoring process output comprising a further indication of an at least potentially malicious source of input data, and to provide the monitoring process output as input to the prevention process for use in the prevention process analysis, and to a detection process as input for use in generating detection process output.

3. The method for mitigating fraud of claim 1, further comprising detecting attributes other than the current attributes compared with known attributes to determine potentially malicious input data received for analysis including certain behavioral anomalies including browsers used by the source.

4. The method for mitigating fraud of claim 1, wherein blocking the selection of the selectable advertisement is performed in real time.

5. The method for mitigating fraud of claim 1, further comprising controlling a processing means via electronic program instructions to the fraud mitigated output to generate a report.

6. The method for mitigating fraud of claim 1, further comprising controlling the processor via electronic program instructions to display a report.

7. The method for mitigating fraud of claim 1, further comprising mitigating fraud in an advertising campaign undertaken in a mobile environment, wherein fraud comprises input data on ads in the mobile environment, and fraud mitigated output comprises input data from a legitimate source.

8. The method for mitigating fraud of claim 1, wherein detecting comprises continuously analyzing digital advertisements at all levels of source engagement for detecting certain behavioral anomalies for blocking input data and at least potentially malicious input data.

9. A mitigating fraud system, comprising:
- a database coupled to an advertiser server configured to store electronic program instructions for controlling an advertiser server with a processor and controlling the processor via the electronic program instructions;
- a local device wirelessly coupled to the database configured for transmitting input data from the local device in response to a selectable advertisement transmitted from the advertiser server to the local device, wherein the input data comprises a selection of the selectable advertisement;
- a processor coupled to the database configured for comparing current attributes of a source of the input data with known attributes of known sources to determine if certain behavioral anomalies of the source of the input data exists;
- wherein the known attributes comprise identifying data of the known sources including demographic origins and activities of the known sources based on registered profile information, wherein the registered profile information includes duplicate profile detection, unusual profile changes, and login pattern anomalies;
- a processor coupled to the database configured for detecting if the source of the input data is a malicious source or legitimate source based on an analysis of an existence of the determined certain behavioral anomalies and the comparison of the current attributes and the known attributes;
- wherein the comparison of the current attributes of the source of the input data and the known sources and the determination if certain behavioral anomalies of the source of the input data exists are configured for storing in an advertiser database;
- a processor coupled to the database configured for performing a prevention process if it is determined that the source of the input data is a malicious source;
- wherein the prevention process comprises preventing the selection of the selectable advertisement to be transmitted to the advertiser server to prevent displaying the selectable advertisement content on the local device;
- a processor coupled to the database configured for generating a fraud mitigated output if it is determined that the source of the input data is the legitimate source, wherein the prevention process comprises allowing the selection of the selectable advertisement to be transmitted to the advertiser server to allow displaying the selectable advertisement content on the local device; and
- a processor coupled to the database using the comparison of the current attributes of the source of the input data and the known sources and the determination if certain behavioral anomalies of the source of the input data exists stored in the database configured to enhance the prevention process when detecting the malicious source.

10. The mitigating fraud system of claim 9, further comprising the processor controlled via the electronic program instructions coupled with the advertiser server configured to perform a monitoring process using the fraud mitigated output to generate a monitoring process output comprising a further indication of an at least potentially malicious source of data communication, and to provide the monitoring process output as input to the prevention process for use in the prevention process analysis, and to a detection process as input for use in generating a detection process output.

11. The mitigating fraud system of claim 9, further comprising a processor coupled to the database configured for detecting attributes other than the current attributes compared with known attributes to determine potentially malicious input data received for analysis including certain behavioral anomalies including browsers used by the source.

12. The mitigating fraud system of claim 9, wherein a processor coupled to the database configured for blocking the selection of the selectable advertisement is performed in real time.

13. The mitigating fraud system of claim 9, further comprising a processor coupled to the database configured for controlling a processing means via the electronic program instructions to the fraud mitigated output to generate a report.

14. The method for mitigating fraud of claim 9, further comprising mitigating fraud in an advertising campaign undertaken in a mobile environment, wherein fraud comprises input data on ads in the mobile environment, and fraud mitigated output comprises input data from a legitimate source.

15. A mitigating fraud system, comprising:
- a database coupled to an advertiser server configured to store electronic program instructions for controlling an advertiser server with a processor and controlling the processor via the electronic program instructions;
- a local device wirelessly coupled to the database configured for transmitting input data from the local device in response to a selectable advertisement transmitted from the advertiser server to the local device, wherein the input data comprises a selection of the selectable advertisement;
- at least one processor coupled to the database configured for comparing current attributes of a source of the input data with known attributes of known sources to determine if certain behavioral anomalies of the source of the input data exists;
- wherein the known attributes comprise identifying data of the known sources including demographic origins and activities of the known sources based on registered profile information, wherein the registered profile information includes duplicate profile detection, unusual profile changes, and login pattern anomalies;
- at least one processor coupled to the database configured for detecting if the source of the input data is a malicious source or legitimate source based on an analysis of an existence of the determined certain behavioral anomalies and the comparison of the current attributes and the known attributes;

wherein the comparison of the current attributes of the source of the input data and the known sources and the determination if certain behavioral anomalies of the source of the input data exists are configured for storing in an advertiser database; and wherein the comparison includes comparing distributions of browsers or browser versions in the traffic to detect anomalies and potential fraud;

at least one processor coupled to the database configured for performing a prevention process if it is determined that the source of the input data is a malicious source;

wherein the prevention process comprises preventing the selection of the selectable advertisement to be transmitted to the advertiser server to prevent displaying the selectable advertisement content on the local device;

at least one processor coupled to the database configured for generating a fraud mitigated output if it is determined that the source of the input data is the legitimate source, wherein the prevention process comprises allowing the selection of the selectable advertisement to be transmitted to the advertiser server to allow displaying the selectable advertisement content on the local device; and at least one processor coupled to the database using the comparison of the current attributes of the source of the input data and the known sources and the determination if certain behavioral anomalies of the source of the input data exists stored in the database configured to enhance the prevention process when detecting the malicious source.

16. The mitigating fraud system of claim 15, further comprising the advertiser server coupled to the processor controlled via the electronic program instructions configured to perform a monitoring process using the fraud mitigated output to generate a monitoring process output comprising a further indication of an at least potentially malicious source of data communication, wherein the monitoring process output is transmitted as input to the prevention process for use in the prevention process analysis, and to a detection process as input for use in generating detection process output.

17. The mitigating fraud system of claim 15, further comprising a processor coupled to the database configured for detecting if the source of the input data is a malicious source and detecting if the source of the input data is a legitimate source based on an analysis is an input to a prevention process analysis.

18. The mitigating fraud system of claim 15, wherein a processor coupled to the database configured for blocking the selection of the selectable advertisement is performed in real time.

19. The mitigating fraud system of claim 15 further comprising a processor coupled to the database configured for controlling a processing means via the electronic program instructions to the fraud mitigated output to generate a report.

20. The mitigating fraud system of claim 15, further comprising a processor controlled via the electronic program instructions to display a report.

* * * * *